(12) United States Patent
Takada

(10) Patent No.: US 8,229,234 B2
(45) Date of Patent: Jul. 24, 2012

(54) CODING AND DECODING DEVICE, CODING AND DECODING METHOD AND PROGRAM

(75) Inventor: Jun Takada, Tokyo (JP)

(73) Assignee: NEC Corporation, Tokyo (JP)

( * ) Notice: Subject to any disclaimer, the term of this patent is extended or adjusted under 35 U.S.C. 154(b) by 635 days.

(21) Appl. No.: 12/516,317

(22) PCT Filed: Nov. 13, 2007

(86) PCT No.: PCT/JP2007/071953
§ 371 (c)(1),
(2), (4) Date: May 26, 2009

(87) PCT Pub. No.: WO2008/062687
PCT Pub. Date: May 29, 2008

(65) Prior Publication Data
US 2010/0054617 A1   Mar. 4, 2010

(30) Foreign Application Priority Data
Nov. 24, 2006  (JP) ................................. 2006-316627

(51) Int. Cl.
*G06K 9/46* (2006.01)

(52) U.S. Cl. .............. 382/238; 375/240.12; 375/240.23; 382/246

(58) Field of Classification Search .................... 382/238
See application file for complete search history.

(56) References Cited

U.S. PATENT DOCUMENTS

| | | | |
|---|---|---|---|
| 4,870,695 A | 9/1989 | Gonzales et al. | |
| 5,663,764 A | 9/1997 | Kondo et al. | |
| 5,680,129 A | 10/1997 | Weinberger et al. | |
| 5,764,374 A | 6/1998 | Seroussi et al. | |
| 6,359,929 B1 * | 3/2002 | Boon ........................ | 375/240.16 |

(Continued)

FOREIGN PATENT DOCUMENTS

EP   0 820 195 A2   1/1998

(Continued)

OTHER PUBLICATIONS

Chinese Official Action dated Jul. 12, 2010 with partial translation.

(Continued)

*Primary Examiner* — Sath V Perungavoor
(74) *Attorney, Agent, or Firm* — Scully, Scott, Murphy & Presser, PC

(57) ABSTRACT

A coding device is comprised of an initial resolution coding unit for coding an initial resolution image sub-sampled from an image at every interval of predetermined pixels, and a high resolution coding unit for coding images at sub-sampling intervals sequentially halved, wherein said high resolution coding unit comprises a pixel value predicting means for, out of the pixels that should be coded in present resolution, predicting a value of a pixel being positioned at a center of its adjacent four pixels already coded in previous resolution from said adjacent four pixels with a linear interpolation, and predicting a value of a remaining pixel from its adjacent four pixels having the above pixel at a center thereof with the linear interpolation, said adjacent four pixels being positioned in an upper, lower, left and right sides of the above pixel, a prediction error calculating means for obtaining a residual between the pixel value of the to-be-coded pixel and the predicted value, and a variable length coding means for coding the residual.

26 Claims, 9 Drawing Sheets

U.S. PATENT DOCUMENTS

| | | | |
|---|---|---|---|
| 7,184,598 B2* | 2/2007 | Abe et al. | 382/232 |
| 7,688,893 B2* | 3/2010 | Morimoto et al. | 375/240.12 |
| 7,693,340 B2* | 4/2010 | Abe et al. | 382/238 |
| 8,116,384 B2* | 2/2012 | Foo et al. | 375/240.29 |
| 8,139,878 B2* | 3/2012 | Abe et al. | 382/238 |

FOREIGN PATENT DOCUMENTS

| | | |
|---|---|---|
| EP | 1 173 006 A2 | 1/2002 |
| JP | 62-019973 | 1/1987 |
| JP | 63-250277 | 10/1988 |
| JP | 64-007854 | 1/1989 |
| JP | 64-073875 | 3/1989 |
| JP | 08-088856 | 4/1996 |
| JP | 2002-118861 | 4/2002 |
| JP | 2005-198014 | 7/2005 |

OTHER PUBLICATIONS

Howard, Paul G. et al., "Fast progressive lossless image compression", Proceedings of the 1994 IST/SPIE, Feb. 1994, pp. 1-12.

Abstract of Japanese Publication No. 64-073875, dated Mar. 20, 1989.

Extended European Search Report dated Aug. 2, 2011 from related European Patent Application No. 07831683.3.

* cited by examiner

| | | |
|---|---|---|
| MATRIX PREDICTION | C ○<br>○ ●<br>A X | $X = (A+C)/2$ |
| AVERAGE PREDICTION | D ○<br>○ ●<br>A X | $X = (A+D)/2$ |
| PLANE PREDICTION | B C<br>○ ○<br>○ ●<br>A X | $X = A-B+C$ |

CODING AND DECODING DEVICE, CODING AND DECODING METHOD AND PROGRAM

APPLICABLE FIELD IN THE INDUSTRY

The present invention relates to a coding/decoding device of a two-dimensional signal, and more particularly to a coding/decoding device of multi-valued two-dimensional signal that employs prediction residuals.

BACKGROUND ART

Conventionally, the prediction coding technique of this type is utilized for data compression that aims at efficiently utilizing a record medium and a transmission path when the two-dimensional signal, which is typified by an image signal, is stored in a record medium, or is transmitted via a network.

There exists the technique of predicting a value of a target pixel from neighboring pixels (upper/left/left upper side, etc.) already coded, and coding a residual (for example, see Patent document 1) as a general technique of the conventional prediction coding. FIG. 10 shows an example of the general prediction technique. A matrix prediction technique predicts a value of a target pixel X from a left-side pixel A and an upper-side pixel C, an average prediction technique predicts the value of the target pixel X from the left-side pixel A and a right upper-side pixel D, and a plane prediction technique predicts the value of the target pixel X from the left pixel A, a left upper-side pixel B, and the upper-side pixel C. Any of these techniques is characterized in that an equation for computing the predicted value is simple, and hence a high processing speed is attained to that extent. There exists JPEG-LS as a representative of the prediction coding adopting this technique.

There exists the technique of firstly coding low-resolution images sub-sampled from an original image at every interval of predetermined pixels, next predicting the value of the remaining not-yet-coded pixel from the already-coded pixels with an interpolation, and coding a residual thereof as another technique of the conventional prediction coding (for example, see Non-patent document 1, patent document 2, and Patent document 3). The point that a resolution progressive function can be realized is listed as an advantageous point of this technique. With this, only the low-resolution component of the image can be extracted, decoded, and displayed even though it is a gigantic image, thereby enabling a cognitive waiting time of a user to be reduced.

The technique of predicting the value of the not-yet-coded pixel from the already-coded pixels in the prediction coding having the resolution progressive function includes the technique of predicting it only by using the pixel of the previous resolution (for example, see Non-patent document 1, and Patent document 3), and the technique of predicting it by using the pixel of the previous resolution and the pixel of the present resolution together (for example, see 0004 paragraph of Patent document 2).

On the other hand, a Huffman code, a Golomb-Rice code, etc. are known as a variable length code suitable for coding the prediction residual. Particularly, the Golomb-Rice coding technique, which is for outputting the signal value as [unary]+[k-bit fixed-length code (k is an estimated value of the number of significant figures)], is known as a technique for simply coding the prediction residual because nearer to zero the value is, the shorter the code length becomes. Further, the Golomb-Rice code is characterized in that when the number of significant figures of the signal value that should be coded, and a k value coincide with each other, the code length becomes shortest, whereby an adaptive Golomb-Rice coding technique for predicting an optimum k value responding to values of residuals that have occurred so far, and the contexts has been devised. For example, the adaptive Golomb-Rice coding technique described in Patent document 4 is a technique of predicting an optimum k value from the distribution of prediction residuals d. Specifically, an absolute value of each of the prediction residuals d that have occurred so far is accumulated, and an average number of significant figures is estimated from its sum total a and the number of times n of the accumulation.

Non-Patent document 1: "Fast Progressive Lossless Image Compression", Proceedings of the 1994 IST/SPIE, 1994/02

Patent document 1: Specification of U.S. Pat. No. 5,680,129
Patent document 2: JP-P2501598B
Patent document 3: JP-P2005-198014A
Patent document 4: Specification of U.S. Pat. No. 5,764,374

DISCLOSURE OF THE INVENTION

Problems to be Solved by the Invention

The prediction coding technique utilizes the fact that a correlation of the pixels that spatially stand closely to each other is high, predicts the value of the target pixel from the adjacent pixels already coded, and codes a difference between the predicted value and the actual pixel value. For this, when the prediction precision is higher, the difference converges in a range of the smaller value, which makes it possible to efficiently carry out the compression with the variable length code. The conventional prediction coding technique having the resolution progressive function, however, has a problem that it is difficult to enhance the prediction precision, and hence, it is difficult to enhance a compression ratio. The following is its reason.

Firstly, with the conventional technique which uses only the pixel of the previous resolution in order to predict the value of the not-yet-coded pixel from the already-coded pixels, the interpolation precision declines in many pixels because the situation often occurs where it is unavoidable to use the already-coded pixels far from the target pixel that is going to be coded from now on. For example, as shown in FIG. 11, thinning out the pixels out vertically and horizontally at a ratio of one pixel to two pixels, coding the pixels with a ○ mark as a low-resolution image, and predicting the values of the remaining pixels with a ■mark from the pixels with a ○ mark with the interpolation causes the interpolation precision of a pixel Y having the neighboring already-coded pixels only in the upper and lower sides thereof to become lower than that of a pixel X having the neighboring already-coded pixels in the left upper, left lower, right upper and right lower sides thereof. The reason is that while the pixel X can be precisely predicted from the adjacent four pixels with a two-dimensional interpolation, the pixel Y is predicted from the two pixels that exist in the upper and lower sides with a one-dimensional interpolation. Needless to say, as shown in FIG. 7 of the Patent document 2, the value of the pixel Y can be also predicted with the two-dimensional interpolation using a matrix operation by employing the values of the surrounding four already-coded pixels; however, the precision of the pixel Y does not become so much higher as the case of the pixel X for considering that the prediction equation becomes complicated because Y is not positioned at the center of the four pixels.

Next, with the conventional technique that uses the pixel of the previous resolution and the pixel of the present resolution together in order to predict the value of the not-yet-coded pixel from the already-coded pixels, the prediction precision of the pixel Y is enhanced as compared with the technique of using only the pixel of the previous resolution because, as shown in FIG. 12, the pixel Y can refer the already-coded pixels in the left, left upper, and right upper sides besides the two low-resolution pixels already coded that exist in the upper and lower sides. However, in order to use the interpolation for more precise prediction, a complicated computation is needed because the right pixel of Y is a not-yet-coded pixel, and the precision does not become so much higher for considering the complicated computation.

An object of the present invention is to realize an enhancement of a compression ratio and a reduction of computation time by enabling the value of the not-yet-coded pixel to be precisely predicted from the already-coded pixels with a simple computation in the prediction coding having the resolution progressive function.

Means for Solving the Problems

The present invention for achieving the above-mentioned object is a coding device, comprising: an initial resolution coding means for coding an initial resolution image sub-sampled from an image at every interval of predetermined pixels; and a high resolution coding means for coding images at sub-sampling intervals sequentially halved, wherein said high resolution coding means comprises: a pixel value predicting means for, out of the pixels that should be coded in present resolution, predicting a value of a pixel being positioned at a center of adjacent four pixels already coded in previous resolution from said adjacent four pixels with a linear interpolation, and predicting a value of a remaining pixel from adjacent four pixels having the above pixel at a center thereof with the linear interpolation, said adjacent four pixels being positioned in an upper, lower, left and right sides of the above pixel; a prediction error calculating means for obtaining a residual between the pixel value of the to-be-coded pixel and the predicted value; and a variable length coding means for coding the residual.

The present invention for achieving the above-mentioned object is a decoding device, comprising: an initial resolution decoding means for decoding an initial resolution image sub-sampled from an image at every interval of predetermined pixels from an input code; and a high resolution decoding means for decoding images at sub-sampling intervals sequentially halved, wherein said high resolution decoding means comprises: a pixel value predicting means for, out of the pixels that should be decoded in present resolution, predicting a value of a pixel being positioned at a center of adjacent four pixels already decoded in previous resolution from said adjacent four pixels with a linear interpolation, and predicting a value of a remaining pixel from adjacent four pixels having the above pixel at a center thereof with the linear interpolation after all of the above adjacent four pixels have been decoded in previous resolution and present resolution, said adjacent four pixels being positioned in an upper, lower, left and right sides of the above pixel; a prediction error decoding means for decoding a residual between the pixel value of the to-be-decoded pixel and the predicted value from the input code; and a pixel value calculating means for calculating the pixel value, being a target, by adding said decoded residual to said predicted pixel value.

The present invention for achieving the above-mentioned object is a method of coding an image by employing a computer, said method comprising: a first step in which said computer codes an initial resolution image sub-sampled from an image at every interval of predetermined pixels; and a second step in which said computer codes images at sub-sampling intervals sequentially halved, wherein said second step comprises a process of, out of the pixels that should be coded in present resolution, predicting a value of a pixel being positioned at a center of adjacent four pixels already coded in previous resolution from said adjacent four pixels with a linear interpolation, predicting a value of a remaining pixel from adjacent four pixels having the above pixel at a center thereof with the linear interpolation, said adjacent four pixels being positioned in an upper, lower, left and right sides of the said pixel, obtaining a residual between the pixel value of the to-be-coded pixel and the predicted value, respectively, and subjecting the above residual to variable length coding.

The present invention for achieving the above-mentioned object is a method of decoding an image from an input code by employing a computer, said method comprising: a first step in which said computer decodes an initial resolution image sub-sampled from an image at every interval of predetermined pixels from an input code; and a second step in which said computer decodes images at sub-sampling intervals sequentially halved, wherein said second step includes a process of, out of the pixels that should be decoded in present resolution, predicting a value of a pixel being positioned at a center of adjacent four pixels already decoded in previous resolution from said adjacent four pixels with a linear interpolation, predicting a value of a remaining pixel from adjacent four pixels having the above pixel at a center thereof with the linear interpolation after all of the above adjacent four pixels have been decoded in previous resolution and present resolution, said adjacent four pixels being positioned in an upper, lower, left and right sides of the above pixel, decoding a residual between the pixel value of the to-be-decoded pixel and the predicted value from the input code, respectively, and calculating the pixel value, being a target, by adding said decoded residual to said predicted pixel value.

The present invention for achieving the above-mentioned object is an coding program for causing a computer to execute: a first process of coding an initial resolution image sub-sampled from an image at every interval of predetermined pixels; and a process of coding images at sub-sampling intervals sequentially halved, said process being a second process of, in a process of, out of the pixels that should be coded in present resolution, the coding in each resolution, predicting a value of a pixel being positioned at a center of adjacent four pixels already coded in previous resolution from said adjacent four pixels with a linear interpolation, predicting a value of a remaining pixel from adjacent four pixels having the above pixel at a center thereof with the linear interpolation, said adjacent four pixels being positioned in an upper, lower, left and right sides of the above pixel, obtaining a residual between the pixel value of the to-be-coded pixel and the predicted value, respectively, and subjecting the above residual to variable length coding.

The present invention for achieving the above-mentioned object is a decoding program for causing a computer to execute: a first process of decoding an initial resolution image sub-sampled from an image at every interval of predetermined pixels from an input code; and a process of decoding images at sub-sampling intervals sequentially halved, said process being a second process of, in a process of the decoding in each resolution, out of the pixels that should be decoded in present resolution, predicting a value of a pixel being positioned at a center of adjacent four pixels already decoded in previous resolution from said adjacent four pixels with a linear interpolation, predicting a value of a remaining pixel from adjacent four pixels having the above pixel at a center thereof with the linear interpolation after all of the above adjacent four pixels have been decoded in previous resolution and present resolution, said adjacent four pixels being positioned in an upper, lower, left and right sides of the above pixel, decoding a residual between the pixel value of the to-be-decoded pixel and the predicted value from the input code, respectively, and calculating the pixel value, being a target, by adding said decoded residual to said predicted pixel value.

An Advantageous Effect of the Invention

The present invention makes it possible to precisely predict the value of the not-yet-coded pixel from the already-coded pixels with a simple computation in the prediction coding having the resolution progressive function.

The reason is that the pixels that should be coded in the present resolution are classified into a first pixel being positioned at the center of the adjacent four pixels already coded in the previous resolution, and a second pixel and a third pixel other than it, the value of the first pixel is predicted and coded from a total four already-coded pixels in the left upper, left lower, right upper, and right lower sides with the linear interpolation, and each of the values of the second pixel and third pixel is predicted and coded from the adjacent four pixels in the upper, lower, left, and right sides with the linear interpolation, whereby the value of any pixel can be simply and yet precisely predicted with the linear interpolation using the adjacent four pixels.

In such a manner, the value of the not-yet-coded pixel can be precisely predicted from the already-coded pixels, thereby allowing a difference between the predicted value and the actual pixel value to converge in a range of the small value, which makes it possible to efficiently carry out the compression with the variable length coding.

BRIEF DESCRIPTION OF THE DRAWINGS

FIG. 1 is a view for explaining an operation of the coding device of the present invention.

DESCRIPTION OF NUMERALS

Figure 2:
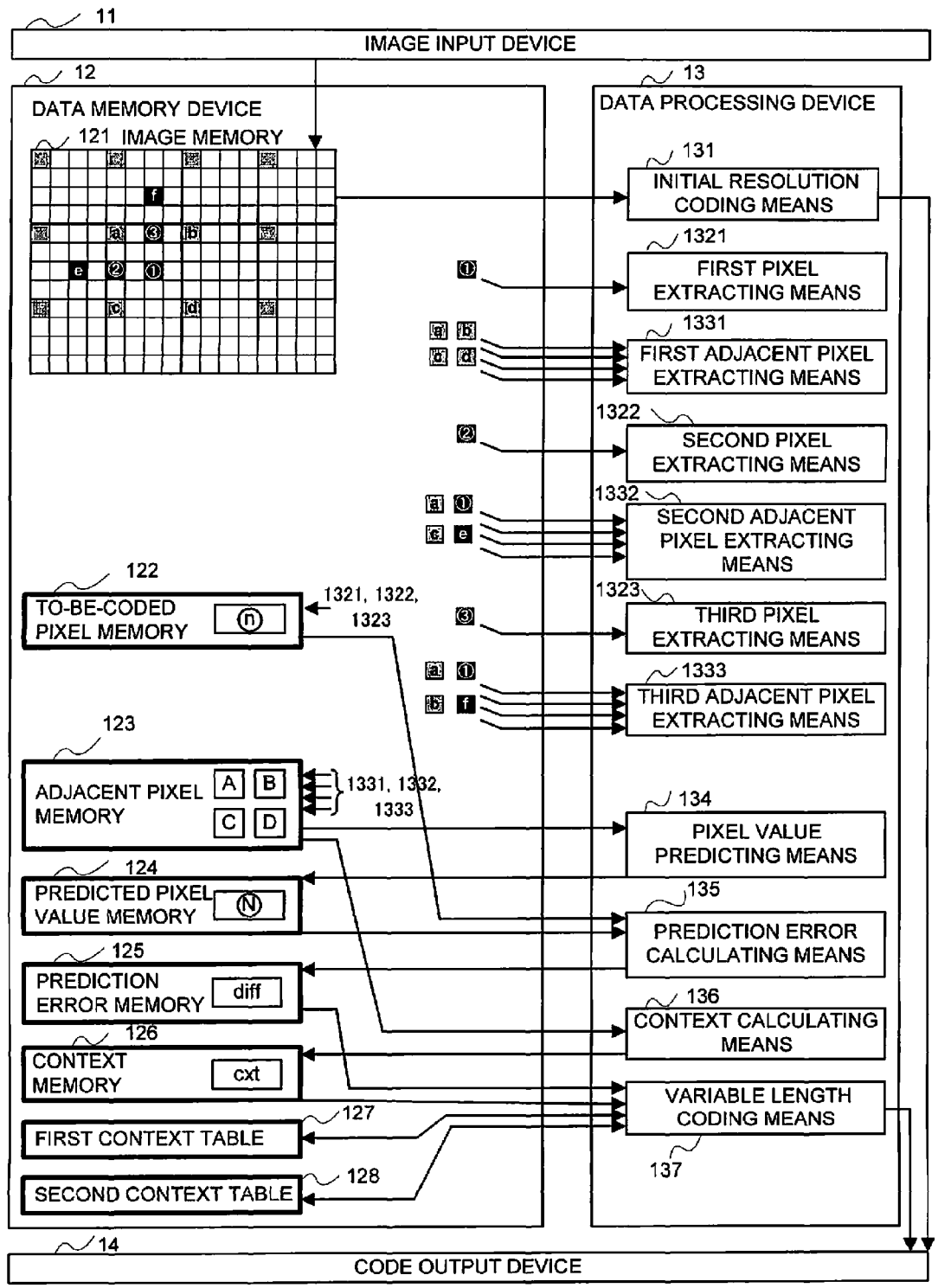
FIG. 2 is a block diagram of one embodiment of the coding device of the present invention.

11 image input device
12 and 22 data memory devices
13 and 23 data processing devices
14 code output device
21 code input device
24 image output device

BEST MODE FOR CARRYING OUT THE INVENTION

Characteristics of the present invention will be explained by listing a simple example for facilitating its understanding. Now, think about the fact that, as shown in FIG. 1(a), after the pixels are thinned out vertically and horizontally at a ratio of one pixel to two pixels, and the pixels with a ○ mark are coded as a low-resolution image, the values of the remaining pixels with a ▪mark are coded. The present invention classifies the pixels that should be coded in the present resolution into the pixel being positioned at the center of the adjacent four pixels already coded in the previous resolution, and the pixels other than it, predicts the value of the former from a total four already-coded pixels ○ in the left upper, left lower, right upper, and right lower sides with the linear interpolation, and subjects a residual between this predicted value and the actual pixel value to the variable length coding. Each of pixels X shown in FIG. 1(b) is the former pixel coded in such a manner.

As shown in FIG. 1(b), when the pixels X are coded besides the pixels with a ○ mark, each of the remaining pixels with a ▪mark that have not been coded comes into being surrounded by the already-coded pixels in all of the upper, lower, left and right sides. That is, the pixel surrounded by the already-coded pixels that existed only in the upper and lower sides thereof in a status of FIG. 1(a) is surrounded by the already-coded pixels in all of the upper, lower, left, and right sides owing to existence of the coded pixels X in the left and right sides thereof like pixels Y of FIG. 1(c). Further, the pixel surrounded by the already-coded pixels that existed only in the left and right sides thereof in a status of FIG. 1(a) is surrounded by the already-coded pixels in all of the upper, lower, left, and right sides owing to existence of the pixels X in the upper and lower sides thereof like pixels Z of FIG. 1(c). Thereupon, each of the values of these pixels Y and Z is predicted from the adjacent four pixels already coded in the previous resolution and the present resolution that are positioned in the upper, lower, left, and right sides thereof with the linear interpolation, and a residual between this predicted value and the actual pixel value is subjected to the variable length coding.

Additionally, the circumference of the not-yet-coded pixels ▪existing in the upper, lower, left, and right ends of the image shown in FIG. 1(c) cannot originally surrounded by the already-coded pixels because each of these pixels exists in the image end. In this case, it is good enough to carry out the interpolation with an appropriate method. For example, with the method of carrying out the interpolation by using the pixels that exist at a turn-back position as against an image boundary, the not-yet-coded pixels ▪that exist in the left and right ends of the image are handled similarly to the pixel Y as shown in FIG. 1(d), and the not-yet-coded pixels ▪that exist in the upper and lower ends of the image are handled similarly to the pixel Z as shown in FIG. 1(d).

While the method of firstly coding all pixels X in the image, and next coding the remaining pixels Y and Z so that the status of FIG. 1(a) is changed to the status of FIG. 1(d) is also acceptable, locality of reference cannot be augmented and the processing speed could lower due to a decline in a cache hit ratio in the case of performing a coding process for cache with a built-in computer because a necessity for scanning the image plural times arises. For this, as shown FIG. 1(e), the method is preferable of sequentially repeating the process in which one pixel Y and one pixel Z are coded after coding one pixel X in a scanning direction (from a direction from a left end to a right end of the image).

Further, the coding order such that the pixel Y is firstly coded, and the pixel Z is coded next is desirable as a coding order of the pixel Y and the pixel Z at that moment. The reason is that while the coding order of X→Z→Y→X, which is obtained when the pixel Y is coded after the pixel Z is coded, necessitate moving to the pixel X far away from the pixel Y after processing the pixel Y as shown in FIG. 1(f), the coding order of X→Y→Z→X, which is obtained when the pixel Z is coded after the pixel Y is coded, allows the distance of Z→X to be made shorter than the distance of Y→X. Upon specifically explaining the coding order from a viewpoint of a relation of the cache, for example, when the pixel with a ● mark of FIG. 1(f) is noticed, while a possibility that the above pixel exists in the cache at the time of the just-after coding of X becomes lower because the above pixel is not used at the time of coding Y with the coding order of X→Z→Y→X, a possibility that the above pixel exists in the cache at the time of the just-after coding of X becomes high because the above pixel is referenced at the time of coding Z with the coding order of X→Y→Z→X.

While the variable length coding means is arbitrary, employing the variable length code having a function of changing a coding parameter responding to the coding context, for example, the adaptive Golomb-Rice code makes it possible to adapt the coding parameter to spatial locality of the pixel value, and to enhance the compression ratio all the more. In this case, the coding context can be calculated with the simple method such that an absolute value of a difference between each of the neighboring four pixel partners, which are employed for a prediction, and the other is obtained, and its sum total is quantized. The reason is that any of the four pixels does not need to be differentiated by using weighting associated with calculation of the context because the four pixels being employed for a prediction are point-symmetrically arranged with the target pixel (the pixel of which the pixel value is to be predicted) at the center.

Further, the coding context of the adjacent four pixels in the case that the adjacent four pixels exist in the left upper, left lower, right upper, and right lower sides of the to-be-predicted pixel being positioned at the center thereof, and the coding context of the adjacent four pixels in the case that the adjacent four pixels exist in the upper, lower, left, and right sides are desirably managed as a different context, respectively, because the pixel X is predicted from the four pixels in the left upper, left lower, right upper, and right lower sides, and each of the pixel Y and the pixel Z is predicted from the four pixels in the upper, lower, left, and right sides. And, with the processing order of the pixel Y and the pixel Z, Y→Z is more desirable than Z→Y from a viewpoint of management of this context. The reason is that traceability of the context statistical value in the case of updating the context in the order of Y→Z→Y→Z . . . is improved as compared with the case of updating the context in the order of Z→Y→Z→Y . . . .

Specifically, in the case of performing the process in the order of Z→Y→Z→Y . . . , the just-before context update is carried out at Z in the one-pixel right side/one-pixel upper side at the moment of coding Y, which does not pose a problem; however the just-before context update is carried out at Y in the three-pixel left side/one-pixel lower side at the moment of coding Z, which poses a problem. On the other hand, in the case of performing the process in the order of Y→Z→Y→Z . . . , the just-before context update is carried out at Z in the one-pixel left side/one-pixel upper side at the moment of coding Y, and further, the just-before context update is carried out at Y in the one-pixel left side/one-pixel lower side at the moment of coding Z. The traceability of the statistical value to the spatial locality of the image is improved in the latter as compared with the former because the statistical value obtained from the pixels that are spatially nearer can be reflected. This enables the optimum coding parameter to be estimated at a high precision, which leads to enhancement in the compression ratio.

In the above explanation, the example in which one pixel Y and one pixel Z were coded after coding one pixel X was shown; however it is also possible to perform the process of coding the pixel Y and the pixel Z in parallel to the process of coding the pixel X in order to make the coding speed fast.

The decoding of the coded image is carried out in a order opposite to that of the coding.

Next, embodiments of the present invention will be explained in details by making a reference to the accompanied drawings.

Embodiment of the Coding Device

Upon making a reference to FIG. 2, one embodiment of the coding device of the present invention is configured of an image input device 11, a data memory device 12, a data processing device 13 that operates under a program control, and a code output device 14.

The image input device 11, which is a device for inputting the image, being a target of the coding, into the data memory device 12, is configured of an imaging device, for example, a camera, a scanner, etc., a communication device for receiving image data from the outside, an external memory device such as a magnetic disc. While a format of the image is arbitrary, the following explanation, for convenience, will be made on the assumption that the image is expressed in a bit map format of N×M (each of N and M is an power of 2) pixels, and each pixel value is expressed with a multi-bit grayscale.

The data memory device 12, which is configured of a main memory device and an auxiliary memory device of a computer, stores the image, being a target of coding, and various items of data generated in the course of its coding process. With this embodiment, the data memory device 12 includes an image memory 121 for storing the image inputted from the image input device 11, a to-be-coded pixel memory 122 for storing the value of the pixel that is currently a target of coding, an adjacent pixel memory 123 for storing the values of the four pixels that exist adjacently to the to-be-coded pixel, a predicted pixel value memory 124 for storing the value of the to-be-coded pixel predicted from the adjacent four pixels, and a prediction error memory 125 for storing a difference between the predicted value of the to-be-coded pixel and the actual value.

Further, in this embodiment, the data memory device 12 are provided with a context memory 126, a first context table 127, and a second context table 128 in addition hereto because the adaptive Golomb-Rice code is employed as a variable length code. The context memory 126 stores the coding context obtained from the adjacent four pixels, and each of the first context table 127 and the second context table 128 is used for storing statistical information of the coding context in order to calculate an optimum Golomb parameter (an estimated value k of the number of significant figures). Herein, the reason why two context tables, i.e. the first context table and the second context table exist is that the coding context of the adjacent four pixels in the case that the adjacent four pixels exist in the left upper, left lower, right upper, and right lower sides of the to-be-predicted pixel being positioned at the center thereof, and the coding context of the adjacent four pixels in the case that the adjacent four pixels exist in the upper, lower, left, and right sides are managed as a different context, respectively.

The data processing device 13, which is configured of CPU etc. of the computer, executes the process of coding the image inputted from the image input device 11, and outputting it to the code output device 14. With this embodiment, the data processing device 13 includes an initial resolution coding means 131, a first pixel extracting means 1321, a first adjacent pixel extracting means 1331, a second pixel extracting means 1322, a second adjacent pixel extracting means 1332, a third pixel extracting means 1323, a third adjacent pixel extracting means 1333, a pixel value predicting means 134, a prediction error calculating means 135, a context calculating means 136, and a variable length coding means 137. The means other than the initial resolution coding means 131, out of them, constitutes a high resolution coding means.

Figures 10, 11:
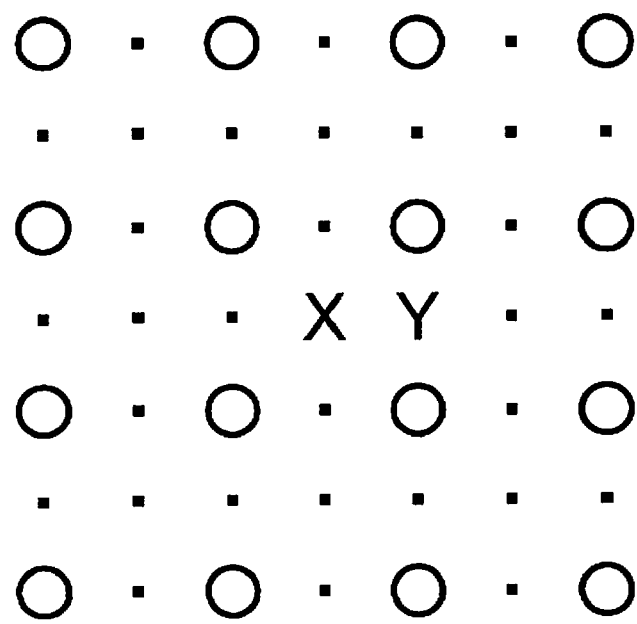
FIG. 10 is an explanatory view of a general prediction technique for predicting the value of the not-yet-coded pixel from the already-coded pixels.
FIG. 11 is an explanatory view of the conventional technique using only the pixel of the previous resolution when predicting the value of the not-yet-coded pixel from the already-coded pixels.
Figure 12:
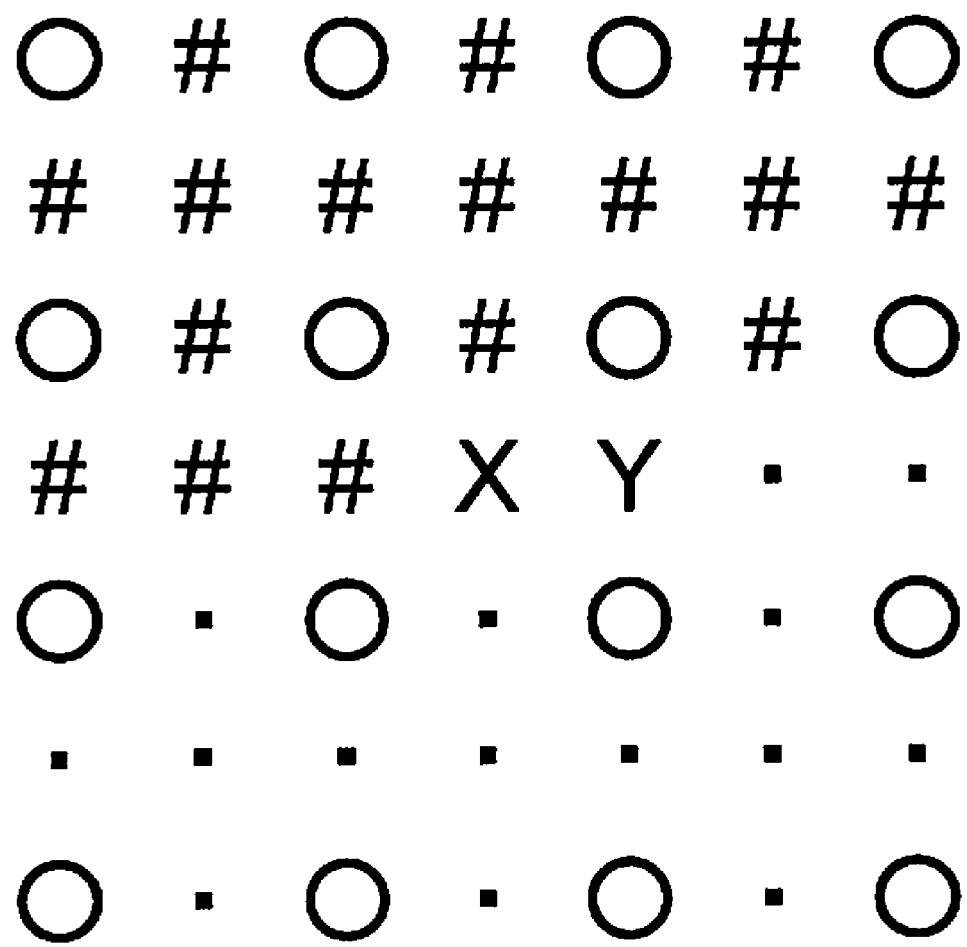
FIG. 12 is an explanatory view of the conventional technique using the pixel of the previous resolution and the pixel of the present resolution together when predicting the value of the not-yet-coded pixel from the already-coded pixels.

The initial resolution coding means 131 sequentially loads the pixel data from the image memory 121, and codes it. Specifically, the initial resolution coding means 131 extracts the images on the image memory 121 sub-sampled (thinned out) vertically and horizontally at a pre-decided ratio of one pixel to n (a power of 2) pixels, subjects them to the variable length coding, and output them to the code output device 14. The initial resolution coding means 131, at the moment of this initial resolution coding, predicts the pixel value of each pixel from the adjacent pixels coded so far, and codes a difference between its predicted value and the actual pixel value. Such various filters (for example, a matrix prediction shown in FIG. 10) employed in the conventional PNG can be utilized as a prediction technique. When the coding in the initial resolution is completed, the coding in the remaining resolution is carried out.

In the coding in the remaining resolution, firstly the not-yet-coded pixels are sampled and coded at an interval that is a half of the sub-sampling interval used in the initial resolution. When the coding is all completed at its sub-sampling interval, the not-yet-coded pixels are sampled and coded at an interval that is a half of its sub-sampling interval, and the coding is repeated until the not-yet-coded pixels run short. In the coding in the remaining resolution, each of the first pixel extracting means 1321, the first adjacent pixel extracting means 1331, the second pixel extracting means 1322, the second adjacent pixel extracting means 1332, the third pixel extracting means 1323, the third adjacent pixel extracting means 1333, the pixel value predicting means 134, the prediction error calculating means 135, the context calculating means 136, and the variable length coding means 137 plays a role mentioned below.

The first pixel extracting means 1321 extracts the pixel being positioned at the center of the adjacent four pixels already coded in the previous resolution, out of the pixels that should be coded in the present resolution, as a first pixel from the image memory 121, and stores it in the to-be-coded pixel memory 122.

The first adjacent pixel extracting means 1331 extracts the adjacent four pixels already coded that are positioned in the left upper, left lower, right upper, and right lower sides of the first pixel from the image memory 121, and stores them in the adjacent pixel memory 123.

The second pixel extracting means 1322, after the first pixel is coded, extracts the not-yet-coded pixel being positioned next to the first pixel in the left side, out of the pixels that should be coded in the present resolution, as a second pixel from the image memory 121, and stores it in the to-be-coded pixel memory 122.

The second adjacent pixel extracting means 1332 extracts the adjacent four pixels already coded that are positioned in the upper, lower, left, and right sides of the second pixel from the image memory 121, and stores them in the adjacent pixel memory 123.

The third pixel extracting means 1323, after the second pixel is coded, extracts the not-yet-coded pixel being positioned next to the first pixel in the upper side, out of the pixels that should be coded in the present resolution, as a third pixel from the image memory 121, and stores it in the to-be-coded pixel memory 122.

The third adjacent pixel extracting means 1333 extracts the adjacent four pixels already coded that are positioned in the upper, lower, left, and right sides of the third pixel from the image memory 121, and stores them in the adjacent pixel memory 123.

The pixel value predicting means 134 obtains an average value of the pixel values stored in the adjacent pixel memory 123, and stores it in the predicted pixel value memory 124.

The prediction error calculating means 135 obtains a difference between the pixel predicted value stored in the predicted pixel value memory 124 and the pixel value stored in the to-be-coded pixel memory 122, and stores it in the prediction error memory 125.

The context calculating means 136 obtains an absolute value of a difference between each of the neighboring pixel partners and the other with respect to the adjacent four pixels stored in the adjacent pixel memory 123, quantizes its sum total, and stores it in the context memory 126 as a coding context.

The variable length coding means 137 subjects the value of the prediction error memory 125 to the variable length coding, and outputs it the code output device 14. With this embodiment, after the variable length coding means 137, which is an adaptive Golomb-Rice coding means, selects a desired table from the first context table 127 and the second context table 128, calculates the estimated value k of the number of significant figures from the statistical information of the context stored therein, and carries out the decoding by employing this k, it reflects this-time coding context stored in the context memory 126 into the foregoing selected context table.

The code output device 14 is a device for outputting the coded data to a record medium, which is not shown in the figure, in some cases, and transmitting it to other devices via a transmission path in some cases, or the like.

Next, an entire operation of the coding device relating to this embodiment will be explained in details by making a reference to flowcharts of FIG. 2 and FIG. 3.

Figure 3:
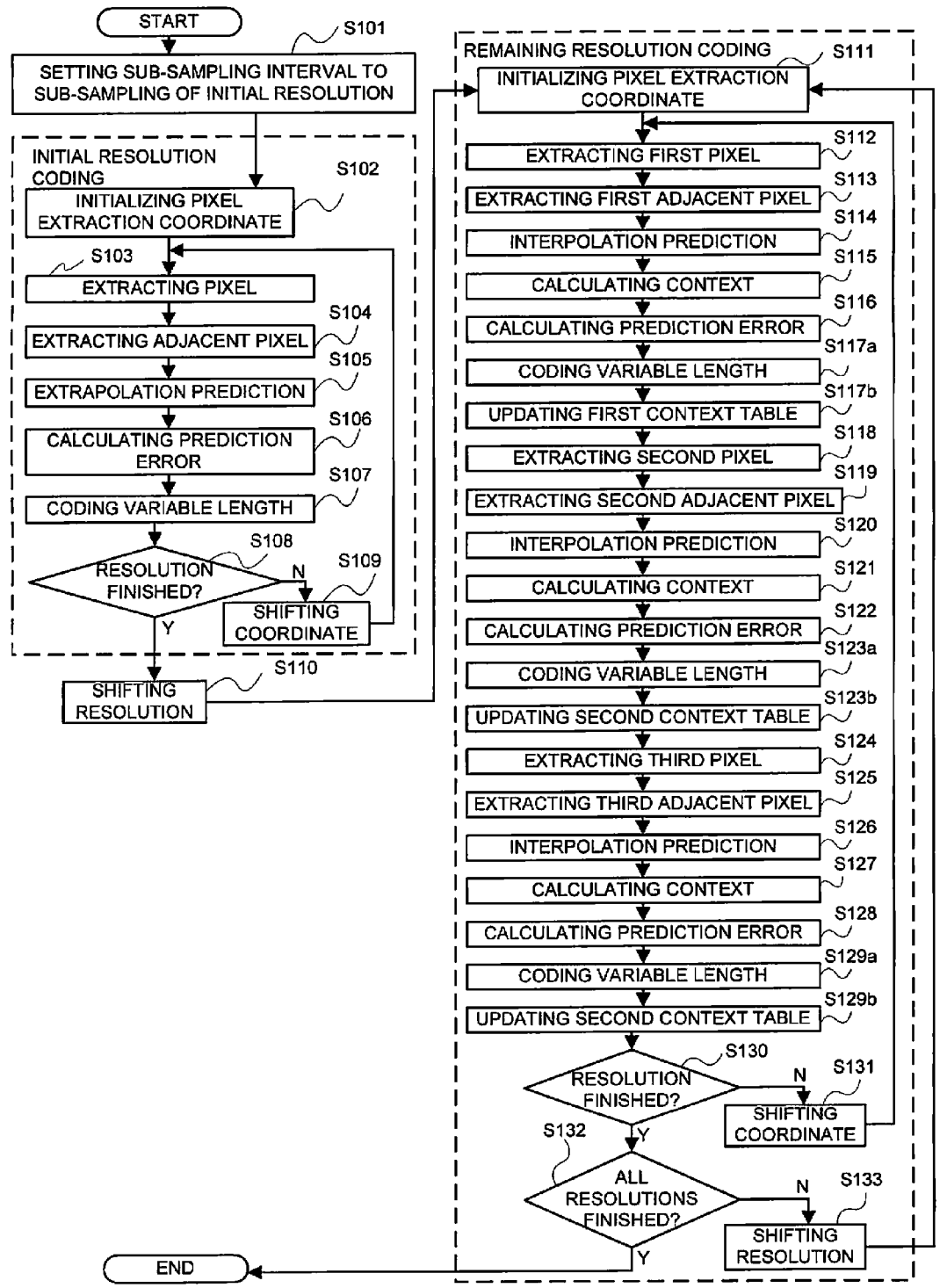
FIG. 3 is a flowchart illustrating a flow of the process of one embodiment of the coding device of the present invention.

Firstly, the sub-sampling interval of the pixel extraction is set to an interval of the initial resolution (step S101 of FIG. 3).

The initial resolution coding means 131 initializes a pixel extraction coordinate as a point of origin (step S102), and sequentially extracts and codes the pixels. Specifically, the initial resolution coding means 131 extracts the pixel at the sub-sampling interval of the initial resolution (step S103), and further, extracts the adjacent pixels thereof (step S104).

Next, the initial resolution coding means 131 carries out an extrapolation prediction from the adjacent pixels with an average-value filter etc. (step S105), calculates the prediction error (step S106), subjects it to the variable length coding (step S107), and outputs it to the code output device 14 (step S107).

Next, it is determined whether the coding at the initial sub-sampling interval of the initial resolution has been all completed (step S108), and when the coding has not been completed, the extraction coordinate is shifted (step S109) and the operation returns to the step S103. When the coding has been completed, the resolution is shifted (the sub-sampling interval is halved) (step S110), and the operation proceeds to the coding in the remaining resolution (step S111 and steps subsequent hereto).

In the coding in the remaining resolution, the pixel extraction coordinate is firstly initialized to the initial coordinate at its sampling interval (step S111).

Next, the first pixel extracting means 1321 extracts the first pixel being positioned at the center of the adjacent four pixels already coded in the previous resolution from the image memory 121, and stores it in the to-be-coded pixel memory 122 (step S112).

Next, the first adjacent pixel extracting means 1331 extracts the four pixels (the left upper, right upper, left lower, and right lower sides) already coded in the previous resolution that are positioned adjacently to the first pixel from the image memory 121, and stores them in the adjacent pixel memory 123 (step S113).

Next, the pixel value predicting means 134 obtains an average value of the pixel values of the four pixels stored in the adjacent pixel memory 123, and stores it in the predicted pixel value memory 124 (step S114).

Next, the context calculating means 136 obtains an absolute value of a difference between each of the neighboring pixel partners and the other with respect to the four pixels stored in the adjacent pixel memory 123, quantizes its sum total, and stores it in the context memory 126 (step S115).

Next, the prediction error calculating means 135 obtains a difference between the pixel predicted value stored in the predicted pixel value memory 124 and the pixel value stored in the to-be-coded pixel memory 122, and stores it in the prediction error memory 125 (step S116).

Next, the variable length coding means 137 calculates the coding parameter (the estimated value k of the number of significant figures) from statistical information of the context stored in the first context table 127, subjects the value of the prediction error memory 125 to the variable length coding, and outputs it the code output device 14 (step S117*a*). Further, the variable length coding means 137 updates the first context table 127 by use of the text of the context memory 126 (step S117*b*).

Above, the process of coding one first pixel is finished, and next, the coding of the second pixel is carried out as follows.

Firstly, the second pixel extracting means 1322 extracts the second pixel being positioned next to the first pixel in the left side from the image memory 121, and stores it in the to-be-coded pixel memory 122 (step S118).

Next, the second adjacent pixel extracting means 1332 extracts the four already-coded pixels (the upper, lower, left, and right sides) being positioned adjacently to the second pixel from the image memory 121, and stores them in the adjacent pixel memory 123 (step S119).

Next, the pixel value predicting means 134 obtains an average value of the pixel values of the four pixels stored in the adjacent pixel memory 123, and stores it in the predicted pixel value memory 124 (step S120).

Next, the context calculating means 136 obtains an absolute value of a difference between each of the neighboring pixel partners and the other with respect to the four pixels stored in the adjacent pixel memory 123, quantizes its sum total, and stores it in the context memory 126 (step S121).

Next, the prediction error calculating means 135 obtains a difference between the pixel predicted value stored in the predicted pixel value memory 124 and the pixel value stored in the to-be-coded pixel memory 122, and stores it in the prediction error memory 125 (step S122).

Next, the variable length coding means 137 calculates the coding parameter (the estimated value k of the number of significant figures) from the statistical information of the context stored in the second context table 128, subjects the value of the prediction error memory 125 to the variable length coding, and outputs it to the code output device 14 (step S123*a*). Further, the variable length coding means 137 updates the second context table 128 by use of the text of the context memory 126 (step S123*b*).

Above, the process of coding one second pixel is finished, and next, the coding of the third pixel is carried out as follows.

Firstly, the third pixel extracting means 1323 extracts the third pixel being positioned next to the first pixel in the upper side from the image memory 121, and stores it in the to-be-coded pixel memory 122 (step S124).

Next, the third adjacent pixel extracting means 1333 extracts the four already-coded pixels (the upper, lower, left, and right sides) being positioned adjacently to the third pixel from the image memory 121, and stores them in the adjacent pixel memory 123 (step S125).

Next, the pixel value predicting means 134 obtains an average value of the pixel values of the four pixels stored in the adjacent pixel memory 123, and stores it in the predicted pixel value memory 124 (step S126).

Next, the context calculating means 136 obtains an absolute value of a difference between each of the neighboring pixel partners and the other with respect to the four pixels stored in the adjacent pixel memory 123, quantizes its sum total, and stores it in the context memory 126 (step S127).

Next, the prediction error calculating means 135 obtains a difference between the pixel predicted value stored in the predicted pixel value memory 124 and the pixel value stored in the to-be-coded pixel memory 122, and stores it in the prediction error memory 125 (step S128).

Next, the variable length coding means 137 calculates the coding parameter (the estimated value k of the number of significant figures) from the statistical information of the context stored in the second context table 128, subjects the value of the prediction error memory 125 to the variable length coding, and outputs it to the code output device 14 (step S129*a*). Further, the variable length coding means 137 updates the second context table 128 by use of the text of the context memory 126 (step S129*b*).

Above, the coding of one third pixel is finished.

Next, it is determined whether the coding at the sub-sampling interval of the present resolution has been all completed (step S130), and when the coding has not been completed, the extraction coordinate is shifted (step S131), and the operation returns to the step S112.

When the coding at the sub-sampling interval of the present resolution has been all completed, it is determined whether the process has been completed with respect to all resolutions (step S132), and when the process has not been completed, the resolution is shifted (the sub-sampling interval is halved) (step S133), and the operation returns to the step S111.

Additionally, in the case that the extraction coordinate of the adjacent pixel goes out of the image (the upper, lower, left and right ends of the image) it is good enough to extract the pixel in the substitute position. For this, there exists, for example, the method of employing the pixel that is positioned at a turned-backed position as against the image boundary or the like, and the technique of deciding the coordinate other than it may be employed because no problem with the decoding arises so long as the methods of deciding the adjacent pixel in the coding side and in the decoding side are identical to each other.

Further, the variable length coding in the initial resolution may employ the conventional DPCM Huffman etc. and may employ the Golomb-Rice code etc. by calculating the context similarly to the case of the remaining resolution. Additionally, in the case of calculating the context in the initial resolution, it is effective that, for example, a difference between the already-coded pixel in the left upper side and the already-coded pixel in the left side, and a difference between the already-coded pixel in the left upper side and the already-coded pixel in the upper side are obtained, and the sum total of its absolute value is quantized and is defined as a context. At that moment, when the upper-side pixel does not exist because of the upper end of the image, it is beneficial that an absolute value of a difference between the left-side pixel already coded and the two-pixel left-side pixel already coded is calculated, quantized, and employed. Also in this respect, the technique of deciding the context other than it may be employed when the adjacent pixel goes out of the image because no problem with the decoding arises so long as the methods of calculating the context in the coding side and in the decoding side are identical to each other.

Next, an effect of the coding device relating to this embodiment will be explained.

The value of the not-yet-coded pixel can be precisely predicted from the already-coded pixels in the prediction coding having the resolution progressive function. The reason is that any pixel can be precisely predicted with the interpolation using the adjacent four pixels because, in the process of, after coding the initial resolution images sub-sampled from the original image at every interval of predetermined pixels, coding the thinned-out pixels in each resolution, the process is repeated of firstly carrying out the linear interpolation from the four pixels (left upper, right upper, left lower, and right lower sides) already coded in the previous resolution so as to predict the first pixel that exists at the center thereof, subjecting its residual to the variable length coding, next carrying out an interpolation prediction of the second pixel and the third pixel that are positioned in the left and upper sides of the first pixel from the total four pixels including the first pixel coded just before and the adjacent three pixels, and subjecting its residual to the variable length coding.

The value of the not-yet-coded pixel can be predicted from the already-coded pixels with a simple computation in the prediction coding having the resolution progressive function. The reason is that the values of the first, second, and third pixels can be predicted with a simple averaged value of the pixel values of the adjacent four pixels because any pixel is predicted from the adjacent four pixels having the above pixel at the center thereof.

The compression ratio can be enhanced. The reason is that, as mentioned above, the value of the not-yet-coded pixel can be precisely predicted from the already-coded pixels. Further, another reason is that the sum total of an absolute value of a difference between each of the adjacent four pixels and the other is subjected to the variable length coding as a context, thereby enabling the coding parameter to be adapted to the spatial locality of the pixel value, which furthermore enhances the compression ratio to that extent. Yet another reason is that adaptability of the coding parameter is improved all the more because the first pixel of which the pixel value is predicted from the adjacent four pixels that exist in the left upper, left lower, right upper, and right lower sides, and the second and third pixels of which the pixel value is predicted from the adjacent four pixels that exist in the upper, lower, left, and right sides are context-managed by using the different context table.

The processing speed can be made fast. The reason is that the value of the not-yet-coded pixel can be predicted from the already-coded pixels with a simple computation. Further, another reason is that the locality of reference at the moment of performing the coding process with the computer having the cache built-in is augmented, and the cache hit ratio is enhanced because the process of, after coding one first pixel, coding the second pixel next hereto in the left side, and the third pixel next hereto in the upper side is sequentially repeated in the scanning direction. In particular, coding the third pixel after coding the second pixel makes it possible to augment the locality of reference all the more.

The coding context can be easily computed. The reason is that any of the four pixels does not need to be differentiated by using weighting associated with calculation of the context, and the coding context can be calculated with such a simple method of obtaining an absolute value of a difference between each of the neighboring pixel partners being employed for prediction and the other, and quantizing its sum total because the four pixels being employed for prediction are point-symmetrically arranged with the target pixel at the center.

Embodiment of the Decoding Device

Figure 4:
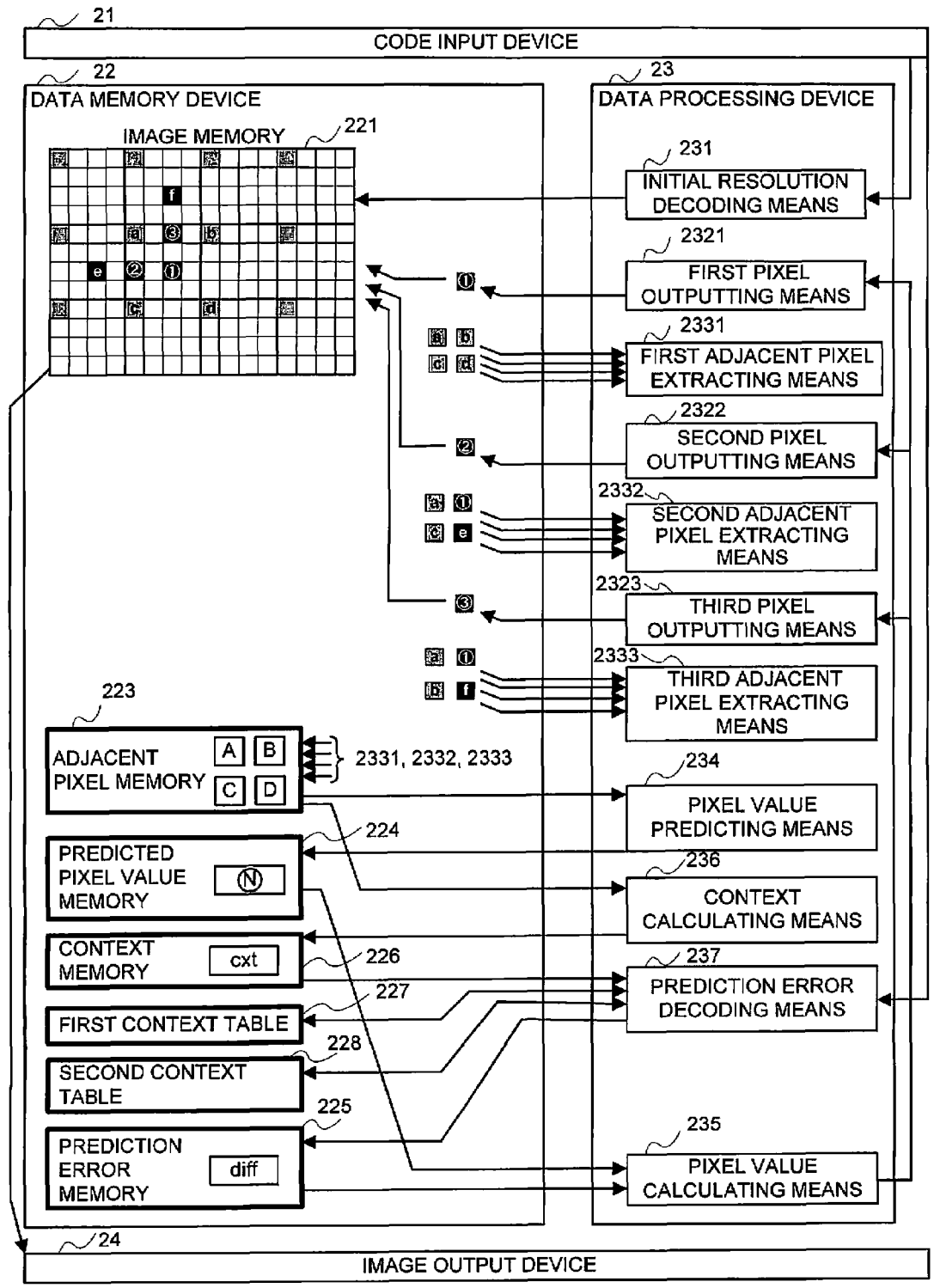
FIG. 4 is a block diagram of one embodiment of the decoding device of the present invention.

Upon making a reference to FIG. 4, one embodiment of the decoding device of the present invention is configured of a code input device 21, a data memory device 22, a data processing device 23 that operates under a program control, and an image output device 24.

The code input device 21 is a device for inputting the variable length code coded in the coding device shown in FIG. 2 into the data processing device 23.

The data memory device 22, which is configured of a main memory device and an auxiliary memory device of a computer, stores the decoded image and various items of data generated in the course of its decoding process. With this embodiment, the data memory device 22 includes an image memory 221 for storing the decoded image, an adjacent pixel memory 223 for storing the values of the four pixels that exist adjacently to a to-be-decoded pixel, a predicted pixel value memory 224 for storing the value of the to-be-decoded pixel predicted from the adjacent four pixels, a prediction error memory 225 for storing a difference between the predicted value of the to-be-decoded pixel and the actual value, a context memory 226 for storing the coding context obtained from the adjacent four pixels, a first context table 227, and a second context table 228.

The data processing device 23, which is configured of CPU etc. of the computer, executes the process of decoding the variable length code inputted from the code input device 21 into the image, and outputting it to the image output device 24. With this embodiment, the data processing device 22 includes an initial resolution decoding means 231, a first pixel outputting means 2321, a first adjacent pixel extracting means 2331, a second pixel outputting means 2322, a second adjacent pixel extracting means 2232, a third pixel outputting means 2323, a third adjacent pixel extracting means 2333, a pixel value predicting means 234, a pixel value calculating means 235, a context calculating means 236, and a prediction error decoding means 237. The means other than the initial resolution decoding means 231, out of them, constitutes a high resolution decoding means.

The initial resolution decoding means 231 sequentially inputs the code corresponding to the image of the initial resolution from the code input device 21, predicts the pixel value by employing a prediction technique identical to the prediction technique employed at the time of the coding, decodes all pixels that should be decoded in the initial resolution by decoding the value of the prediction error from the code inputted from the code input device 21 and adding it to the predicted pixel value, and outputs them to the image memory 221 at the sub-sampling interval of the initial resolution. When the decoding in the initial resolution is completed, the decoding in the remaining resolution is carried out.

In the decoding in the remaining resolution, the not-yet-decoded pixels are firstly decoded at an interval that is a half of the sub-sampling interval of the initial resolution. When the decoding at its sub-sampling interval is all completed, the sub-sampling interval is furthermore halved, and the decoding is repeated until the not-yet-decoded pixels run short. In the decoding in the remaining resolution, each of the first pixel outputting means 2321, the first adjacent pixel extracting means 2331, the second pixel outputting means 2322, the second adjacent pixel extracting means 2332, the third pixel outputting means 2323, the third adjacent pixel extracting means 2333, the pixel value predicting means 234, the pixel value calculating means 235, the context calculating means 236, and the prediction error decoding means 237 plays a role mentioned below.

The first adjacent pixel extracting means 2331 extracts the four pixels (left upper, right upper, left lower, and right lower sides) already decoded in the previous resolution from the image memory 221, and stores them in the adjacent pixel memory 223.

When the first pixel being positioned at the center of the adjacent four pixels extracted as a first adjacent pixel is decoded, the first pixel outputting means 2321 outputs it to the image memory 221.

The second adjacent pixel extracting means 2332, after the first pixel is decoded, defines the coding pixel being positioned next to the first pixel in the left side, out of the pixels that should be decoded in the present resolution, as a second pixel, and extracts the four already-decoded pixels (upper, lower, left, and right sides) being positioned adjacently to this second pixel from the image memory 221, and stores them in the adjacent pixel memory 223.

The second pixel outputting means 2322, when the second pixel is decoded, outputs it to the image memory 221.

The third adjacent pixel extracting means 2333, after the second pixel is decoded, defines the coding pixel being positioned next to the first pixel in the upper side, out of the pixels that should be decoded in the present resolution, as a third pixel, and extracts the four already-decoded pixels (upper, lower, left, and right sides) that are positioned adjacently to this third pixel from the image memory 221, and stores them in the adjacent pixel memory 223.

The third pixel outputting means 2323, when third pixel is decoded, outputs it to the image memory 221.

The pixel value predicting means 234 obtains an average value of the pixel values of the adjacent four pixels stored in the adjacent pixel memory 223, and stores it in the predicted pixel value memory 224.

The context calculating means 236 obtains an absolute value of a difference between each of the neighboring pixel partners and the other with respect to the adjacent four pixels stored in the adjacent pixel memory 223, quantizes its sum total, and stores it in the context memory 226.

The prediction error decoding means 237 reads out and decodes the value of the prediction error from the code input device 21, and stores it in the prediction error memory 225. With this embodiment, after the prediction error decoding means 237, which is an adaptive Golomb-Rice decoding means, selects a desired table from the first context table 227 and the second context table 228, calculates the estimated value k of the number of significant figures from the statistical information of the context stored therein, and carries out the decoding by employing this k, it reflects this-time coding context stored in the context memory 226 into the foregoing selected context table.

The pixel value calculating means 235 calculates the pixel value, being a target, by adding the value of the prediction error memory 225 to the pixel value stored in the predicted pixel value memory 224, and outputs it to the image memory 221 via the first to third pixel output means 2321 to 2323.

The image output device 24 is a device for displaying the decoded image on a display in some cases, and storing it in an external memory device in some cases, or transmitting it to other devices via a transmission path, or the like.

Next, an entire operation of the decoding device relating to this embodiment will be explained in details by making a reference to flowcharts of FIG. 4 and FIG. 5.

Figure 5:
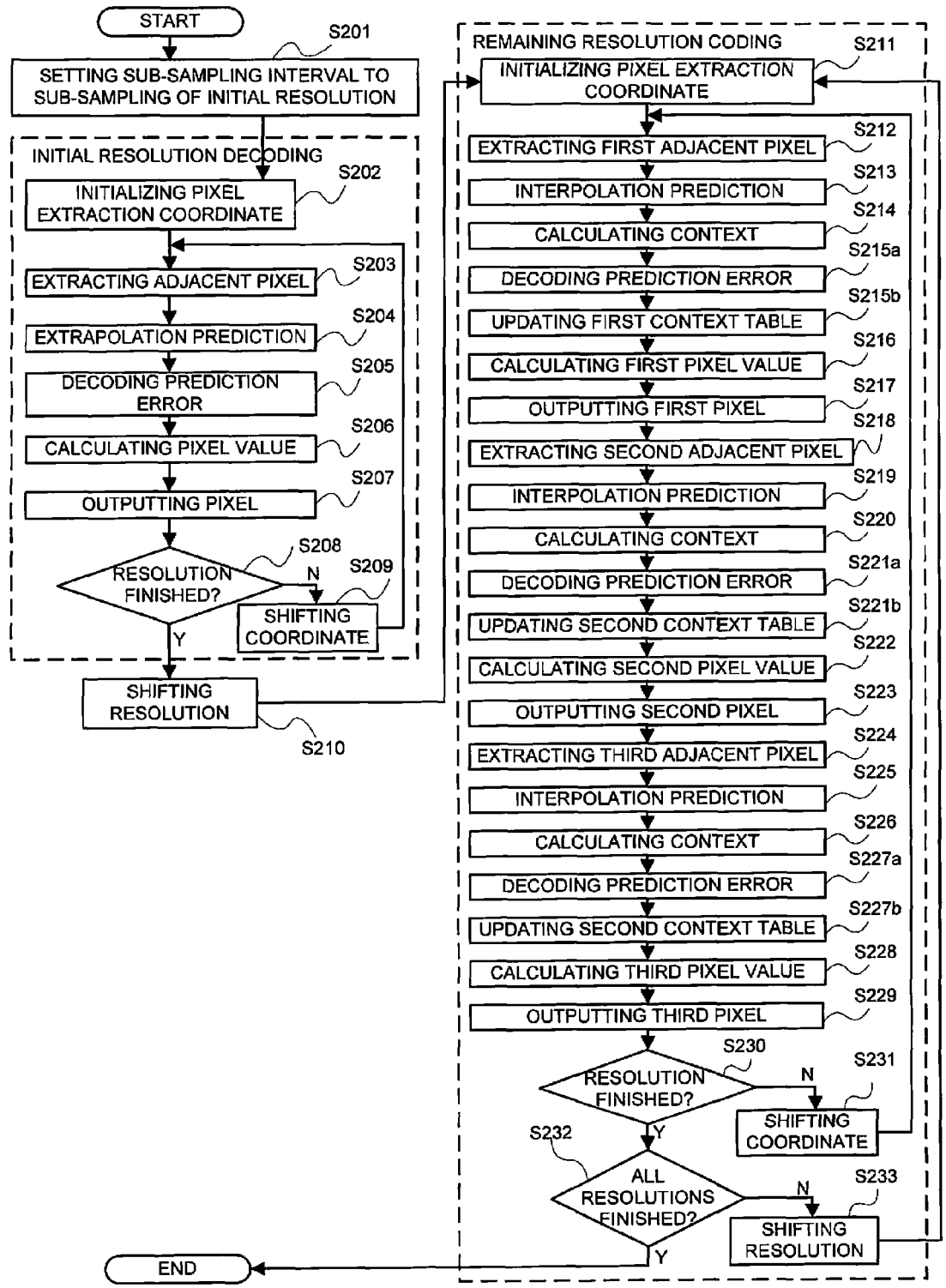
FIG. 5 is a flowchart illustrating a flow of the process of one embodiment of the decoding device of the present invention.

Firstly, the sub-sampling interval of the pixel decoding is set to an interval of the initial resolution (step S201 of FIG. 5).

The initial resolution decoding means 231 initializes a pixel extraction coordinate as a point of origin (step S202), and sequentially decodes the pixels. Specifically, the initial resolution decoding means 231 extracts the adjacent pixels at the sub-sampling interval of the initial resolution (step S203), and carries out an extrapolation prediction with an average-value filter etc. (step S204). Next, the initial resolution decoding means 231 reads out and decodes the value of the prediction error from the code input device 21 (step S205), and calculates the pixel value by adding the decoded value to the predicted pixel value (step S206). Above, the decoded pixel values of the initial resolution are sequentially outputted to the image memory 221 at the sub-sampling interval of the initial resolution (step S207).

Next, it is determined whether the decoding at the initial sub-sampling interval of the initial resolution has been all completed (step S208), and when the decoding has not been completed, the extraction coordinate is shifted (step S209) and the operation returns to the step S203. When the decoding has been completed, the resolution is shifted (the sub-sampling interval is halved) (step S210), and the operation proceeds to the decoding in the remaining resolution (step S211 and steps subsequent hereto)

In the decoding in the remaining resolution, the pixel extraction coordinate is firstly initialized to the initial coordinate at its sampling interval (step S211).

Next, the first adjacent pixel extracting means 2331 extracts the four pixels (left upper, right upper, left lower, and right lower sides) already coded in the previous resolution, and stores them in the adjacent pixel memory 223 (step S212).

Next, the pixel value predicting means 234 obtains an average value of the pixel values of the four pixels stored in the adjacent pixel memory 223, and stores it in the predicted pixel value memory 224 (step S213).

Next, the context calculating means 236 obtains an absolute value of a difference between each of the neighboring pixel partners and the other with respect to the four pixels stored in the adjacent pixel memory 223, quantizes its sum total, and stores it in the context memory 226 (step S214).

Next, the prediction error decoding means 237 calculates the coding parameter (the estimated value k of the number of significant figures) from the statistical information of the context stored in the first context table 227, decodes the value of the prediction error read out from the code input device 21, and stores it in the prediction error memory 225 (step S215a). Further, the prediction error decoding means 237 updates the first context table 227 by use of the text of the context memory 226 (step S215b).

Next, the pixel value calculating means 235 calculates the pixel value of the first pixel, being a target, by adding the value of the prediction error memory 225 to the pixel value stored in the predicted pixel value memory 224 (step S216).

Next, the first pixel outputting means 2321 outputs the pixel value of the first pixel to the image memory 221 (step S217).

Above, the process of decoding one first pixel is finished, and next, the decoding of the second pixel is carried out as follows.

Firstly, the second adjacent pixel extracting means 2332 extracts the four pixels (the upper, lower, left, and right sides) adjacent to the second pixel being positioned next to the first pixel in the left side, and stores them in the adjacent pixel memory 223 (step S218).

Next, the pixel value predicting means 234 obtains an average value of the pixel values of the four pixels stored in the adjacent pixel memory 223, and stores it in the predicted pixel value memory 224 (step S219).

Next, the context calculating means 236 obtains an absolute value of a difference between each of the neighboring pixel partners and the other with respect to the four pixels stored in the adjacent pixel memory 223, quantizes its sum total, and stores it in the context memory 226 (step S220).

Next, the prediction error decoding means 237 calculates the coding parameter (the estimated value k of the number of significant figures) from the statistical information of the context stored in the second context table 228, decodes the value of the prediction error read out from the code input device 21, and stores it in the prediction error memory 225 (step S221a). Further, the prediction error decoding means 237 updates the second context table 228 by use of the text of the context memory 226 (step S221b).

Next, the pixel value calculating means 235 calculates the pixel value of the second pixel, being a target, by adding the value of the prediction error memory 225 to the pixel value stored in the predicted pixel value memory 224 (step S222).

Next, the second pixel outputting means 2322 outputs the pixel value of the second pixel to the image memory 221 (step S223).

Above, the process of decoding one second pixel is finished, and next, the decoding of the third pixel is carried out as follows.

Firstly, the second adjacent pixel extracting means 2332 extracts the four pixels (the upper, lower, left, and right sides) adjacent to the third pixel being positioned next to the first pixel in the upper side, and stores them in the adjacent pixel memory 223 (step S224).

Next, the pixel value predicting means 234 obtains an average value of the pixel values of the four pixels stored in the adjacent pixel memory 223, and stores it in the predicted pixel value memory 224 (step S225).

Next, the context calculating means 236 obtains an absolute value of a difference between each of the neighboring pixel partners and the other with respect to the four pixel stored in the adjacent pixel memory 223, quantizes its sum total, and stores it in the context memory 226 (step S226).

Next, the prediction error decoding means 237 calculates the coding parameter (the estimated value k of the number of significant figures) from the statistical information of the context stored in the second context table 228, decodes the value of the prediction error read out from the code input device 21, and stores it in the prediction error memory 225 (step S227a). Further, the prediction error decoding means 237 updates the second context table 228 by use of the text of the context memory 226 (step S227b).

Next, the pixel value calculating means 235 calculates the pixel value of the third pixel, being a target, by adding the value of the prediction error memory 225 to the pixel value stored in the predicted pixel value memory 224 (step S228).

Next, the third pixel outputting means 2323 outputs the pixel value of the third pixel to the image memory 221 (step S229).

Above, the process of decoding one third pixel is finished.

Next, it is determined whether the decoding at the sub-sampling interval of the present resolution has been all completed (step S230), and when the decoding has not been completed, the extraction coordinate is shifted (step S231) and the operation returns to the step S212.

When the decoding in the sub-sampling interval of the present resolution has been all completed, it is determined whether the process has been completed with respect to all resolutions (step S232), and when the process has not been completed, the resolution is shifted (the sub-sampling interval is halved) (step S233), and the operation returns to the step S211.

The decoding device of this embodiment makes it possible to decode the image coded by the coding device of the embodiment shown in FIG. 2 precisely and speedily.

EXAMPLE

Example of the Coding Device

Next, a specific example of the coding device of the present invention will be explained.

Figure 6:
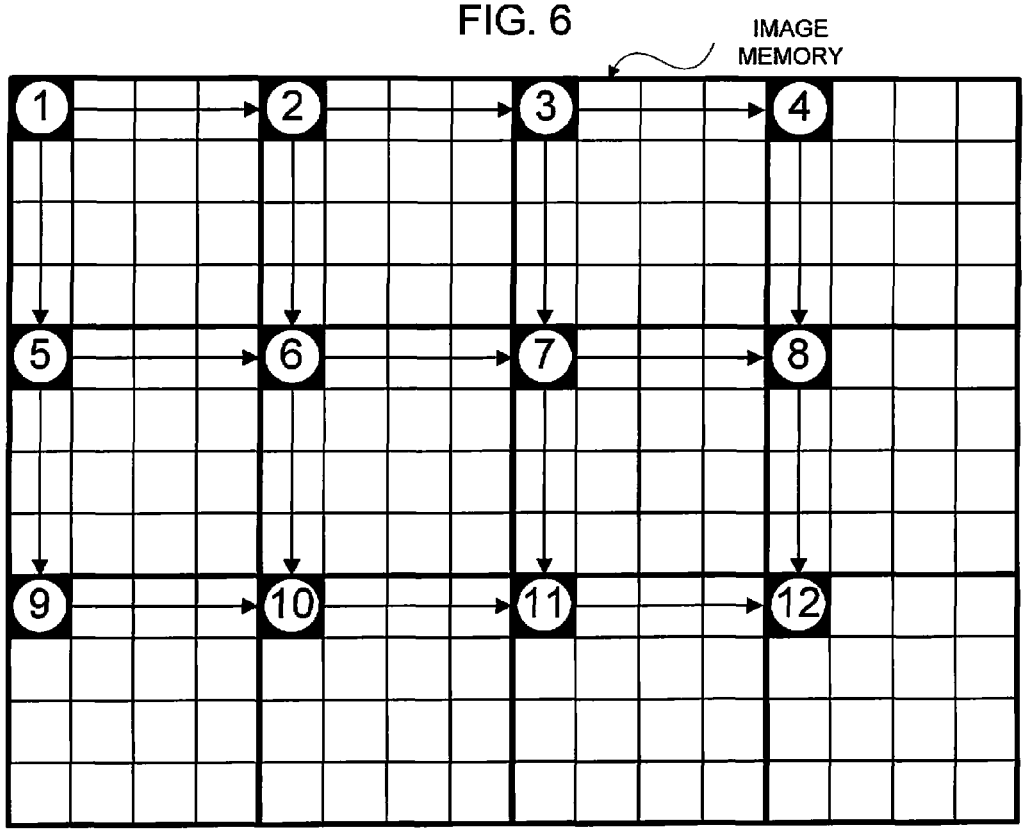
FIG. 6 is an explanatory view of a coding operation and a decoding operation in an initial resolution of the coding device and the decoding device of the present invention.
Figure 7:
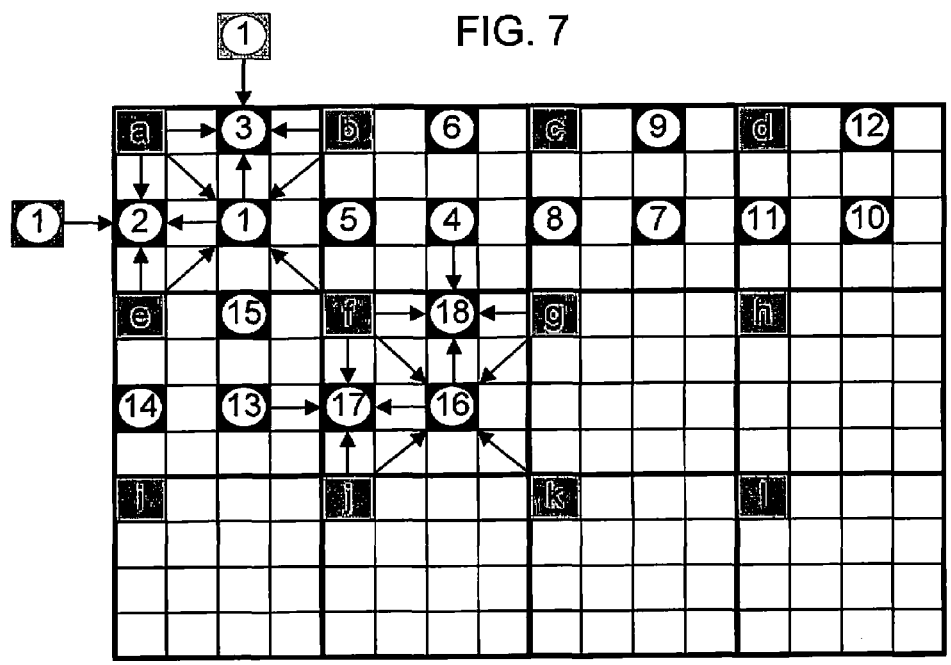
FIG. 7 is an explanatory view of a coding operation and a decoding operation in a high resolution of the coding device and the decoding device of the present invention.

Each of FIG. 6 and FIG. 7 is a view schematically illustrating a coding operation by the coding device relating to this example. In this example, it is assumed that the coding device is provided with a personal computer as the data processing device 13, a semiconductor memory (which is included in the personal computer) as the data memory device 12, and a magnetic disc device as the code output device 14. Further, it is assumed that image data is given as a file on the magnetic disc device.

Firstly, the image data is loaded from the magnetic disc device and stored in the image memory 121.

The initial resolution coding means 131 extracts the pixels from the image memory 121 at a predetermined interval, being an interval of the initial resolution, subjects them to the variable length coding, and outputs the codes to the magnetic disc device. Herein, it is assumed that the initial resolution is ¼ of that of the original image, and the pixels are extracted at every interval of four pixels both vertically and horizontally.

Specifically, the initial resolution coding means 131 extracts the pixels in the order of (1)→(2)→(3)→ . . . →(11)→(12) of the image memory 121 of FIG. 6, and subjects them to two-dimensional DPCM coding with an average value of the pixel values of the upper-side and left-side pixels already coded defined as a predicted value (for example, an average value of (2) and (5) is defined as a predicted value of (6)).

When all pixels of the initial resolution have been coded with the process mentioned above, the operation proceeds to the process of the coding in the next resolution (½ of the resolution of the original image).

FIG. 7 is a view schematically illustrating the process of the coding in the ½ resolution. Each of a, b, c, d, . . . , j, k, and 1 is a pixel already coded by the initial resolution coding means 131, and the coding is carried out in the order of (1)→(2)→(3)→ . . . →(17)→(18) in the process of the coding in the ½ resolution.

Firstly, the first pixel extracting means 1321 extracts the pixel (1) and stores it in the to-be-coded pixel memory 122. Further, the first adjacent pixel extracting means 1331 extracts the already-coded pixels in the left upper, right upper, left lower, and right lower sides of the pixel (1), namely, a, b, e, and f, and stores them in the adjacent pixel memory 123.

Next, the prediction of the pixel value and the calculation of the coding context value are carried out from these adjacent pixels a, b, e, and f, and a difference between the pixel value of the to-be-coded pixel and the predicted value is coded. The detail will be described later.

Next, the second pixel extracting means 1322 extracts the pixel (2) and stores it in the to-be-coded pixel memory 122. Further, the second adjacent pixel extracting means 1332 extracts the already-coded pixels in the upper, lower, left, and right sides of the pixel (2), and stores them in the adjacent pixel memory 123. Herein, (1), which is turned backed, is referenced as a left-side pixel of the pixel (2) because the pixel (2) exits in the left end of the image. As a result, a, e, (1), and (1) are extracted, and stored in the adjacent pixel memory 123.

Next, the prediction of the pixel value and the calculation of the coding context value are carried out from these adjacent pixels a, e, (1), and (1), and a difference between the pixel value of the to-be-coded pixel and the predicted value is coded. The detail will be described later.

Next, the third pixel extracting means 1323 extracts the pixel (3) and stores it in the to-be-coded pixel memory 122. Further, the third adjacent pixel extracting means 1333 extracts the already-coded pixels in the upper, lower, left, and right sides of the pixel (3), and stores them in the adjacent pixel memory 123. Herein, (1), which is turned backed, is referenced as an upper-side pixel of the pixel (3) because the pixel (3) exits in the upper end of the image. As a result, a, b, (1), and (1) are extracted, and stored in the adjacent pixel memory 123.

Next, the prediction of the pixel value and the calculation of the coding context value are carried out from these adjacent pixels a, b, (1), and (1), and a difference between the pixel value of the to-be-coded pixel and the predicted value is coded. The detail will be described later.

The process above is similarly performed for the pixel (4) and the pixels subsequent hereto. Additionally, with regard to the pixels each of which is not a pixel existing in the image end, for example, (16) to (18), the four already-coded pixels adjacent hereto are all extracted as an adjacent pixel.

Next, the prediction of the pixel value and the calculation of the coding context value, which are carried out in the course of the coding, and the coding of a difference will be explained by making a reference to FIG. 8.

Figure 8:
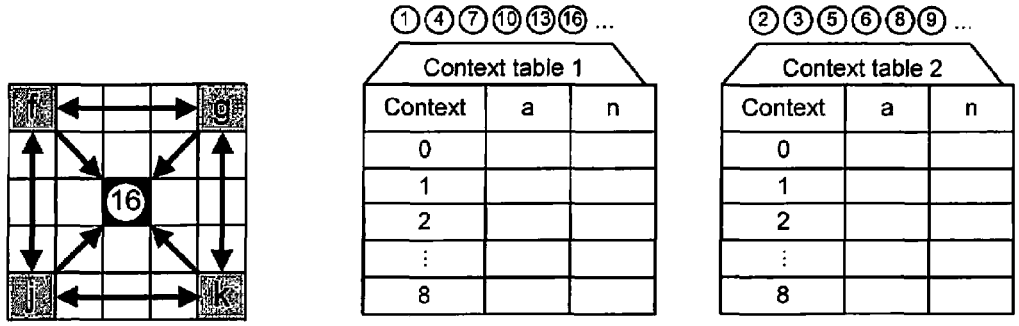
FIG. 8 is an explanatory view of a prediction of the pixel value and a calculation of the coding context value that are carried out in the course of coding, and coding of a difference.

FIG. 8 is a view schematically illustrating a coding operation of the pixel (16) in FIG. 7. The pixel (16) has been stored in the to-be-coded pixel memory 122 by the first pixel extracting means 1321, and the pixels f, g, j, and k have been stored in the adjacent pixel memory 123 by the first adjacent pixel extracting means 1331.

The pixel value predicting means 134 obtains an average value Predict of the pixels f, g, j, and k, and stores it in the predicted pixel value memory 124.

The prediction error calculating means 135 obtains a difference DPCM between the pixel value of the to-be-coded pixel (16) and the predicted pixel value Predict, and stores it in the prediction error memory 125.

The context calculating means 136 obtains the sum total of an absolute value of a difference between each of the adjacent pixel partners that neighbor each other and the other, quantizes it, and stores it as Context in the context memory 126. Herein, a difference between f and g, a difference g and k, a difference between k and j, and a difference between j and f are obtained, and the sum total of its absolute value are quantized to nine kinds of the values, i.e. 0 to 8.

The context calculating means 136 furthermore selects the context table number so that the variable length coding means 137 can employ the separate context in the case of a diagonal prediction and in the case of a vertical and horizontal prediction. That is, the variable length coding means 137 predicts the pixels (1), (4), (7), (10), (13), and (16) . . . from the adjacent pixels that exist in a diagonal direction, i.e. in the left upper, right upper, left lower, and right lower sides, whereby the context calculating means 136 selects the first context table 127, which is employed therefor, and the variable length coding means 137 predicts the pixels (2), (3), (5), (6), (8), and (9) . . . from the adjacent pixels that exist in the upper, lower, left and right sides, whereby the context calculating means 136 selects the second context table 128 different from the first context table 127.

The variable length coding means 137 carries out adaptive Golomb-Rice coding responding to the selected context table 127 or 128 and the context value by employing the technique of the Patent document 4, or the like. In this adaptive Golomb-Rice coding process, an occurrence number n of the corresponding context value in the selected context table and an accumulated sum a of the prediction error magnitude are sequentially updated, an optimum Golomb parameter (the estimated value of the number of significant figures) is calculated each time, the Golomb-Rice coding is carried out by employing the above parameter, and further the occurrence number n of the corresponding context value in the selected context table and the accumulated sum a are updated.

The process mentioned above is continued until the coding of all pixels of the ½ resolution is completed, and the process of the coding in the ½ resolution is completed. In addition hereto, performing the similar process until the coding of all pixels of the 1/1 resolution is completed allows the coding to be completed with respect to all hierarchies, and the codes are outputted to the magnetic disc device.

Example of the Decoding Device

Next, an example of the decoding device of the present invention will be explained.

Each of FIG. 6 and FIG. 7 is a view schematically illustrating a decoding operation by the decoding device relating to this example. In this example, it is assumed that the decoding device is provided with a personal computer as the data processing device 23, a semiconductor memory (which is included in the personal computer) as the data memory device 22, and a magnetic disc device as the image output device 24. Further, it is assumed that coded data is given as a file on the magnetic disc device.

The initial resolution decoding means 231 sequentially decodes the codes from the coded data, and outputs the pixels to the image memory 221 at a predetermined interval, being an interval of the initial resolution. Herein, it is assumed that the initial resolution is ¼ of that of the original image, and the pixels are decoded at every interval of four pixels. Specifically, the initial resolution decoding means 231 subjects the pixels to two-dimensional DPCM decoding with an average value of the pixel values of the upper-side and left-side already-coded pixels defined as a predicted value (for example, an average value of (2) and (5) is defined as a predicted value of (6)) in the order of (1)→(2)→(3)→ . . . → (11)→(12) of the image memory 221 as shown in FIG. 6, and outputs the pixel values.

When all pixels of the initial resolution have been decoded with the process mentioned above, the operation proceeds to the process of the decoding in the next resolution (½ of the resolution of the original image).

FIG. 7 is a view schematically illustrating the process of the decoding in the ½ resolution. Each of a, b, c, d, . . . , j, k, and l is a pixel already decoded by the initial resolution decoding means 231, and the decoding is carried out in the order of (1)→(2)→(3)→ . . . →(17)→(18) in the process of the ½ resolution.

Firstly, the first adjacent pixel extracting means 2331 extracts the already-coded pixels in the left upper, right upper, left lower, and right lower sides of the pixel (1), namely, a, b, e, and f, and stores them in the adjacent pixel memory 223.

Next, the prediction of the pixel value and the calculation of the coding context value are carried out from these adjacent pixels a, b, e, and f, and the prediction difference is decoded. In addition hereto, the pixel value is calculated with the pixel predicted value and the prediction difference, and is outputted as the pixel (1) to the image memory 221. The detail will be described later.

Next, the second adjacent pixel extracting means 2332 extracts the already-coded pixels in the upper, lower, left, and right sides of the pixel (2), and stores them in the adjacent pixel memory 223. Herein, pixel (1), which is turned backed, is referenced as a left-side pixel of the pixel (2) because the pixel (2) exits in the left end of the image. As a result, a, e, (1), and (1) are extracted, and stored in the adjacent pixel memory 223.

Next, the prediction of the pixel value and the calculation of the coding context value are carried out from these adjacent pixels a, e, (1), and (1), and the prediction difference is decoded. In addition hereto, the pixel value is calculated with the pixel prediction value and the prediction difference and is outputted as the pixel (2) to the image memory 221. The detail will be described later.

Next, the third adjacent pixel extracting means 2333 extracts the already-coded pixels in the upper, lower, left, and right sides of the pixel (3), and stores them in the adjacent pixel memory 223. Herein, (1), which is turned backed, is referenced as an upper-side pixel of the pixel (3) because the pixel (3) exits in the upper end of the image. As a result, a, b, (1), and (1) are extracted, and stored in the adjacent pixel memory 223.

Next, the prediction of the pixel value and the calculation of the coding context value are carried out from these adjacent pixels a, b, (1), and (1), and the prediction difference is decoded. In addition hereto, the pixel value is calculated with the pixel prediction value and the prediction difference and is outputted as the pixel (3) to the image memory 221. The detail will be described later.

The process above is similarly performed for the pixel (4) and the pixels subsequent hereto. Additionally, with regard to the pixels each of which is not a pixel existing in the image end, for example, pixels (16) to (18), the already-coded pixels adjacent hereto are all extracted as an adjacent pixel.

Next, the prediction of the pixel value and the calculation of the coding context value in the decoding process, the decoding of a difference, and the calculation of the pixel value will be explained by making a reference to FIG. 9.

Figure 9:
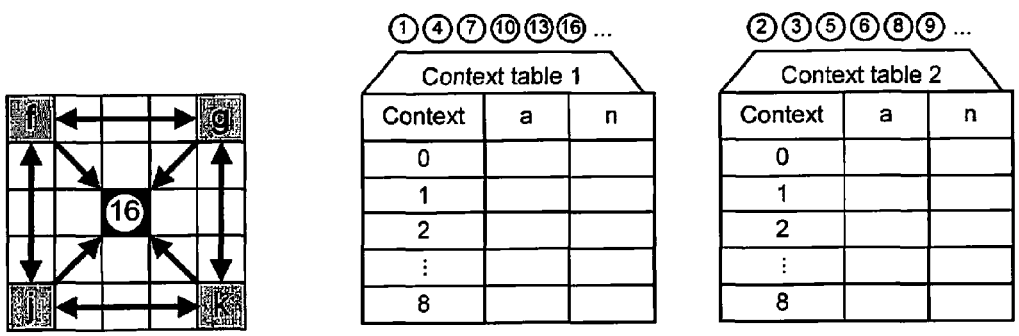
FIG. 9 is an explanatory view of a prediction of the pixel value and a calculation of the coding context value that are carried out in the course of decoding, decoding of a difference, and a calculation of the pixel value.

FIG. 9 is a view schematically illustrating a decoding operation of the pixel (16) in FIG. 7. The pixels f, g, j, and k have been stored in the adjacent pixel memory 223 by the first adjacent pixel extracting means 2331.

The pixel value predicting means 234 obtains an average value Predict of the pixels f, g, j, and k, and stores it in the predicted pixel value memory 224.

The context calculating means 236 obtains the sum total of an absolute value of a difference between each of the adjacent pixel partners that neighbor each other and the other, quantizes it, and stores it as Context in the context memory 226. Herein, a difference between f and g, a difference between g and k, a difference between k and j, and a difference between j and f are obtained, and the sum total of its absolute value are quantized to nine kinds of the values, i.e. 0 to 8.

The context calculating means furthermore selects the context table number so that the separate context can be employed in the case of a diagonal prediction and in the case of a vertical and horizontal prediction, respectively. That is, the pixels (1), (4), (7), (10), (13), and (16) . . . are predicted from the adjacent pixels that exist in a diagonal direction, i.e. in the left upper, right upper, left lower, and right lower sides, whereby the context calculating means selects the first context table 227, which is employed therefor, and the pixels (2), (3), (5), (6), (8), and (9) . . . are predicted from the adjacent pixels that exist in the upper, lower, left, and right sides, whereby the context calculating means selects the second context table 228 different from the first context table 227.

The prediction error decoding means 237 carries out adaptive Golomb-Rice decoding responding to the selected context table and the context value by employing the technique of the Patent document 4, or the like. In this adaptive Golomb-Rice decoding, an occurrence number n of the corresponding context value in the context table and an accumulated sum a of the prediction error magnitude are sequentially updated, and an optimum Golomb parameter (the number of significant figures) is calculated each time.

The pixel value calculating means 235 adds the value of the decoded prediction difference to the predicted pixel value Predict, and outputs it as the to-be-decoded pixel (16).

The process mentioned above is continued until the decoding of all pixels of the ½ resolution is completed, and thus, the process of the decoding in the ½ resolution is completed. In addition hereto, performing the similar process until the decoding of all pixels of the 1/1 resolution is completed allows the decoding to be completed with respect to all hierarchies, and the text of the image memory 221 is outputted to the magnetic disc device.

While the present invention has been described in detail with respect to specific embodiments and examples thereof, it will be appreciated that those skilled in the art, upon attaining an understanding of the foregoing, may readily conceive of alteration to, variations of, and equivalent to the embodiments.

For example, while the Golomb-Rice code was used as a variable length code, the other kinds of the variable length codes such as the Huffman code can also be used.

Further, while the resolution progressive function mode of a three-hierarchy resolution, i.e. ¼ resolution, ½ resolution and 1/1 resolution was exemplified, the present invention is also applicable to a resolution progressive function mode of four hierarchies or more.

Further, while the example in which any of the vertical pixel number M and the horizontal pixel number N of the to-be-coded image coincides with a power of 2 was shown, the pixels existing in the ends can be similarly processed with the method of employing the pixel that is positioned at the turned-back position as against the image boundary, or the like even though it does not coincide with a power of 2.

Further, while the explanation was made on the assumption that each pixel value was expressed with the multi-bit grayscale, performing the similar process for each of the pixels expressed with a format other than it, for example, a multi-bit RBG color value, or a signal obtained by converting the multi-bit RBG color value into a brightness signal (Y) and two color difference signals (U and V) enables the coding and the decoding. In this case, the context table may be prepared separately for each of them, and may be shared by the partners resembling each other in a property. For example, U and V may share the first context table and the second context table with each other because they resemble each other in property.

Further, a coding order is not limited to the order shown in FIG. 7 so long as the coding method is a method of, after coding the first pixel, coding the second pixel and the third pixel. For example, the pixels may be coded in the order of . . . (10)→(11)→(12)→(13)→(14)→(15) . . . , which demands the turning-back at the image end. Further, the pixels may be coded in the order of . . . (1)→(2)→(3)→(13)→(14)→(15) . . . , which demands the vertical-direction scanning, and the pixels may be coded in the order of . . . (1)→(2)→(3)→(4)→(5)→(6)→(13)→(14)→(15) . . . , which demands the zigzag scanning.

Further, while the decoding requires that the first pixel be decoded prior to the processing of the second pixel and the third pixel, the coding up to a final step of outputting the code can be executed for the first to third pixels in parallel. That is, promoting the process of coding the second pixel and the third pixel in parallel with the process of coding the first pixel enables the processing speed of the coding to be enhanced.

Further, with regard to the coding device and decoding device of the present invention have, needless to say, its function can be realized in a hardware manner, and furthermore can be realized with a computer and a program. The program, which is recorded by computer-readable record media such as a magnetic disc and a semiconductor memory, is provided, and is read off by a computer at the starting-up time thereof or the like, controls an operation of the above computer, thereby causing the above computer to function as the coding device and the decoding device expressed in each of the foregoing embodiments, and to execute the foregoing coding process and decoding process.

HOW THE INVENTION IS CAPABLE OF INDUSTRIAL EXPLOITATION

The present invention is applicable to the field such that the image is coded at a high speed and transmitted in a system requiring acquisition of a high-quality video, for example, a monitoring system and an analyzing system. Further, the present invention is also applicable to the field such that the high-resolution video is archived at a high quality, and the part equivalent to the necessary resolution, out of the archived high-resolution video, is extracted at a high speed, transmitted, an displayed.

This application is based upon and claims the benefit of priority from Japanese patent application No. 2006-316627, filed on Nov. 24, 2006, the disclosure of which is incorporated herein in its entirety by reference.

The invention claimed is:

1. A coding device, comprising:
an initial resolution coding unit for coding an initial resolution image sub-sampled from an image at every interval of predetermined pixels; and
a high resolution coding unit for coding images at sub-sampling intervals sequentially halved, wherein said high resolution coding unit comprises:
a first adjacent pixel extracting unit for extracting adjacent four pixels already coded in previous resolution;
a first pixel extracting unit for extracting the pixel being positioned at a center of the adjacent four pixels already coded in the previous resolution as a first pixel;
a second pixel extracting unit for extracting the not-yet-coded pixel being positioned in a left side of said first pixel as a second pixel;
a second adjacent pixel extracting unit for extracting the adjacent four pixels already coded that are positioned in an upper, lower, left, and right sides of said second pixel;
a third pixel extracting unit for extracting the not-yet-coded pixel being positioned in an upper side of said first pixel as a third pixel;
a third adjacent pixel extracting unit for extracting the adjacent four pixels already coded that are positioned in an upper, lower, left, and right sides of said third pixel;
a pixel value predicting unit for, out of the pixels that should be coded in present resolution, predicting a value of said first pixel from the adjacent four pixels already coded in the previous resolution, which have been extracted by said first adjacent pixel extracting unit, with a linear interpolation, and predicting a value of said second pixel and a value of said third pixel from the already-coded adjacent four pixels extracted by said second adjacent pixel extracting unit and the already-coded adjacent four pixels extracted by said third adjacent pixel extracting unit, respectively, with the linear interpolation after said first pixel is coded;
a prediction error calculating unit for obtaining a residual between the pixel value of the to-be-coded pixel and the predicted value; and
a variable length coding unit for coding the residual.

2. A coding device according to claim 1, wherein said high resolution coding unit codes said third pixel after coding said second pixel.

3. A coding device according to claim 1, wherein said high resolution coding unit performs a process of coding said second pixel and said third pixel in parallel with a process of coding said first pixel.

4. A coding device according to claim 1:
wherein said high resolution coding unit comprises a context calculating unit for obtaining an absolute value of a difference between each of the neighboring pixel partners and the other with respect to said adjacent four pixels, performing a quantizing process for its sum total, and obtaining a coding context; and
wherein said variable length coding unit changes a coding parameter responding to said coding context.

5. A coding device according to claim 4, wherein said context calculating unit manages the coding context of said adjacent four pixels in the case that said adjacent four pixels exist in a left upper, left lower, right upper, and right lower sides of the to-be-predicted pixel being positioned at the center thereof, and the coding context of said adjacent four pixels in the case that said adjacent four pixels exist in an upper, lower, left, and right sides as a different context, respectively.

6. A decoding device, comprising:
- an initial resolution decoding unit for decoding an initial resolution image sub-sampled from an image at every interval of predetermined pixels from an input code; and
- a high resolution decoding unit for decoding images at sub-sampling intervals sequentially halved, wherein said high resolution decoding unit comprises:
- a first adjacent pixel extracting unit for extracting adjacent four pixels already decoded in previous resolution;
- a pixel value predicting unit for, out of the pixels that should be decoded in present resolution, predicting a value of a pixel being positioned at a center of adjacent four pixels already decoded in previous resolution from said adjacent four pixels with a linear interpolation, and predicting a value of a remaining pixel from adjacent four pixels having the above pixel at a center thereof with the linear interpolation after all of the above adjacent four pixels have been decoded in previous resolution and present resolution, said adjacent four pixels being positioned in an upper, lower, left and right sides of the above pixel;
- a prediction error decoding unit for decoding a residual between the pixel value of the to-be-decoded pixel and the predicted value from the input code;
- a pixel value calculating unit for calculating the pixel value, being a target, by adding said decoded residual to said predicted pixel value;
- a first pixel outputting unit for outputting a pixel value of a first pixel calculated by said pixel value calculating unit, said first pixel being positioned at a center of the adjacent four pixels extracted by said first adjacent pixel extracting unit;
- a second adjacent pixel extracting unit for, after said first pixel is decoded, extracting the adjacent four pixels already decoded that are positioned in an upper, lower, left, and right sides of a not-yet decoded second pixel being positioned in a left side of said first pixel;
- a second pixel outputting unit for outputting a pixel value of the second pixel calculated by said pixel value calculating unit, said second pixel being positioned at a center of the adjacent four pixels extracted by said second adjacent pixel extracting unit;
- a third adjacent pixel extracting unit for, after said first pixel is decoded, extracting the adjacent four pixels already decoded that are positioned in an upper, lower, left, and right sides of a not-yet decoded third pixel being positioned in an upper side of said first pixel; and
- a third pixel outputting unit for outputting a pixel value of the third pixel calculated by said pixel value calculating unit, said third pixel being positioned at a center of the adjacent four pixels extracted by said third adjacent pixel extracting unit.

7. A decoding device according to claim 6, wherein said high resolution decoding unit decodes said third pixel after decoding said second pixel.

8. A decoding device according to claim 6:
- wherein said high resolution decoding unit comprises a context calculating unit for obtaining an absolute value of a difference between each of the neighboring pixel partners and the other with respect to said adjacent four pixels, performing a quantizing process for its sum total, and obtaining a coding context; and
- wherein said prediction error decoding unit changes a decoding parameter responding to said coding context.

9. A decoding device according to claim 8, wherein said context calculating unit manages the coding context of said adjacent four pixels in the case that said adjacent four pixels exist in a left upper, left lower, right upper, and right lower sides of the to-be-predicted pixel being positioned at the center thereof, and the coding context of said adjacent four pixels in the case that said adjacent four pixels exist in an upper, lower, left, and right sides as a different context, respectively.

10. A method of coding an image by employing a computer, said method comprising:
- a first step in which said computer codes an initial resolution image sub-sampled from an image at every interval of predetermined pixels; and
- a second step in which said computer codes images at sub-sampling intervals sequentially halved, wherein said second step comprises a process of, out of the pixels that should be coded in present resolution:
- predicting a value of a first pixel being positioned at a center of adjacent four pixels already coded in previous resolution from said adjacent four pixels with a linear interpolation;
- predicting a value of a not-yet-coded second pixel being positioned in a left side of said first pixel, after said first pixel is coded, from adjacent four pixels having the second pixel at a center thereof with the linear interpolation, said adjacent four pixels being positioned in an upper, lower, left and right sides of the said second pixel;
- predicting a value of a not-yet-coded third pixel being positioned in an upper side of said first pixel, after said first pixel is coded, from adjacent four pixels having the third pixel at a center thereof with the linear interpolation, said adjacent four pixels being positioned in an upper, lower, left and right sides of the said third pixel; and
- obtaining a residual between the pixel value of the to-be-coded pixel and the predicted value, respectively, and subjecting the above residual to variable length coding.

11. A method of decoding an image from an input code by employing a computer, said method comprising:
- a first step in which said computer decodes an initial resolution image sub-sampled from an image at every interval of predetermined pixels from an input code; and
- a second step in which said computer decodes images at sub-sampling intervals sequentially halved, wherein said second step includes a process of, out of the pixels that should be decoded in present resolution:
- predicting a value of a first pixel being positioned at a center of adjacent four pixels already decoded in previous resolution from said adjacent four pixels with a linear interpolation;
- predicting a value of a not-yet-coded second pixel being positioned in a left side of said first pixel, after said first pixel is decoded, from adjacent four pixels having the second pixel at a center thereof with the linear interpolation after all of the above adjacent four pixels have been decoded in previous resolution and present resolution, said adjacent four pixels being positioned in an upper, lower, left and right sides of the second pixel;
- predicting a value of a not-yet-coded third pixel being positioned in an upper side of said first pixel, after said first pixel is decoded, from adjacent four pixels having the third pixel at a center thereof with the linear interpolation after all of the above adjacent four pixels have been decoded in previous resolution and present resolution, said adjacent four pixels being positioned in an upper, lower, left and right sides of the third pixel; and
- decoding a residual between the pixel value of the to-be-decoded pixel and the predicted value from the input code, respectively, and calculating the pixel value, being a target, by adding said decoded residual to said predicted pixel value.

12. A computer-readable storage device embodying a coding program for causing a computer to execute:
   a first process of coding an initial resolution image sub-sampled from an image at every interval of predetermined pixels; and
   a process of coding images at sub-sampling intervals sequentially halved, said process being a second process of, in a process of the coding in each resolution, out of the pixels that should be coded in present resolution:
   predicting a value of a first pixel being positioned at a center of adjacent four pixels already coded in previous resolution from said adjacent four pixels with a linear interpolation;
   predicting a value of a not-yet-coded second pixel being positioned in a left side of said first pixel, after said first pixel is coded, from adjacent four pixels having the second pixel at a center thereof with the linear interpolation, said adjacent four pixels being positioned in an upper, lower, left and right sides of the second pixel;
   predicting a value of a not-yet-coded third pixel being positioned in an upper side of said first pixel, after said first pixel is coded, from adjacent four pixels having the third pixel at a center thereof with the linear interpolation, said adjacent four pixels being positioned in an upper, lower, left and right sides of the third pixel; and
   obtaining a residual between the pixel value of the to-be-coded pixel and the predicted value, respectively, and subjecting the above residual to variable length coding.

13. A computer-readable storage device according to claim 12, wherein said second process includes the steps of:
   extracting the adjacent four pixels already coded in the previous resolution;
   extracting the pixel being positioned at a center of the adjacent four pixels already coded in the previous resolution as a first pixel;
   extracting the not-yet-coded pixel being positioned in a left side of said first pixel as a second pixel;
   extracting the adjacent four pixels already coded that are positioned in an upper, lower, left and right sides of said second pixel;
   extracting the not-yet-coded pixel being positioned in an upper side of said first pixel as a third pixel; and
   extracting the adjacent four pixels already coded that are positioned in an upper, lower, left and right sides of said third pixel.

14. A computer-readable storage device according to claim 13, wherein, in said second process, said third pixel is coded after said second pixel is coded.

15. A computer-readable storage device according to claim 13, wherein, in said second process, a process of coding said second pixel and said third pixel is performed in parallel with a process of coding said first pixel.

16. A recording medium computer-readable storage device according to claim 12:
   wherein said second process includes a step of obtaining an absolute value of a difference between each of the neighboring pixel partner and the other with respect to said adjacent four pixels, performing a quantizing process for its sum total, and obtaining a coding context; and
   wherein a coding parameter of the variable length coding is changed responding to said coding context.

17. A computer-readable storage device according to claim 16, wherein the coding context of said adjacent four pixels in the case that said adjacent four pixels exist in a left upper, left lower, right upper, and right lower sides of the to-be-predicted pixel being positioned at the center thereof, and the coding context of said adjacent four pixels in the case that said adjacent four pixels exist in an upper, lower, left, and right sides are managed as a different context, respectively.

18. A computer-readable storage device embodying a decoding program for causing a computer to execute:
   a first process of decoding an initial resolution image sub-sampled from an image at every interval of predetermined pixels from an input code; and
   a process of decoding images at sub-sampling intervals sequentially halved, said process being a second process of, in a process of the decoding in each resolution, out of the pixels that should be decoded in present resolution:
   predicting a value of a first pixel being positioned at a center of adjacent four pixels already decoded in previous resolution from said adjacent four pixels with a linear interpolation;
   predicting a value of a not-yet-coded second pixel being positioned in a left side of said first pixel, after said first pixel is decoded, from adjacent four pixels having the second pixel at a center thereof with the linear interpolation after all of the above adjacent four pixels have been decoded in previous resolution and present resolution, said adjacent four pixels being positioned in an upper, lower, left and right sides of the second pixel;
   predicting a value of a not-yet-coded third pixel being positioned in an upper side of said first pixel, after said first pixel is decoded, from adjacent four pixels having the third pixel at a center thereof with the linear interpolation after all of the above adjacent four pixels have been decoded in previous resolution and present resolution, said adjacent four pixels being positioned in an upper, lower, left and right sides of the third pixel; and
   decoding a residual between the pixel value of the to-be-decoded pixel and the predicted value from the input code, respectively, and calculating the pixel value, being a target, by adding said decoded residual to said predicted pixel value.

19. A computer-readable storage device according to claim 18, wherein said second process includes the steps of:
   extracting the adjacent four pixels already decoded in the previous resolution;
   outputting the calculated pixel value of a first pixel being positioned at a center of the above extracted adjacent four pixels;
   after decoding said first pixel, extracting adjacent four pixels already decoded that are positioned in an upper, lower, left and right sides of a not-yet-decoded second pixel being positioned in a left side of said first pixel;
   outputting the calculated pixel value of the second pixel being positioned at a center of the above extracted adjacent four pixels; and
   after decoding said second pixel, extracting adjacent four pixels already decoded that are positioned in an upper, lower, left and right sides of a not-yet-decoded third pixel being positioned in an upper side of said first pixel; and
   outputting the calculated pixel value of the third pixel being positioned at a center of the above extracted adjacent four pixels.

20. A computer-readable storage device according to claim 19, wherein, in said second process, said third pixel is decoded after said second pixel is decoded.

21. A computer-readable storage device according to claim 18:
  wherein said second process includes a step of obtaining an absolute value of a difference between each of the neighboring pixel partners and the other with respect to said adjacent four pixels, performing a quantizing process for its sum total, and obtaining a coding context; and
  wherein a decoding parameter is changed responding to said coding context.

22. A computer-readable storage device according to claim 21, wherein the coding context of said adjacent four pixels in the case that said adjacent four pixels exist in a left upper, left lower, right upper, and right lower sides of the to-be-predicted pixel being positioned at the center thereof, and the coding context of said adjacent four pixels in the case that said adjacent four pixels exist in an upper, lower, left, and right sides are managed as a different context, respectively.

23. A coding device, comprising:
  an initial resolution coding unit for coding an initial resolution image sub-sampled from an image at every interval of predetermined pixels; and
  a high resolution coding unit for coding images at sub-sampling intervals sequentially halved;
  wherein said high resolution coding unit comprises:
    a first pixel extracting unit for extracting the pixel being positioned at a center of adjacent four pixels already coded in previous resolution as a first pixel;
    a second pixel extracting unit for extracting the not-yet-coded pixel being positioned in a left side of said first pixel as a second pixel;
    a third pixel extracting unit for extracting the not-yet-coded pixel being positioned in an upper side of said first pixel as a third pixel;
    a pixel value predicting unit for, out of the pixels that should be coded in present resolution, predicting a value of the first pixel with a linear interpolation, and predicting a value of a remaining pixel from said adjacent four pixels having the first pixel at a center thereof with the linear interpolation, said adjacent four pixels being positioned in an upper, lower, left and right sides of the first pixel:
    a prediction error calculating unit for obtaining a residual between the pixel value of the to-be-coded pixel and the predicted value;
    a variable length coding unit for coding the residual; and
  wherein said high resolution coding unit codes one said second pixel and one said third pixel after coding one said first pixel.

24. A coding device, comprising:
  an initial resolution coding unit for coding an initial resolution image sub-sampled from an image at every interval of predetermined pixels; and
  a high resolution coding unit for coding images at sub-sampling intervals sequentially halved:
  wherein said high resolution coding unit comprises:
    a pixel value predicting unit for, out of the pixels that should be coded in present resolution, predicting a value of a pixel being positioned at a center of adjacent four pixels already coded in previous resolution from said adjacent four pixels with a linear interpolation, and predicting a value of a remaining pixel from adjacent four pixels having the above pixel at a center thereof with the linear interpolation, said adjacent four pixels being positioned in an upper, lower, left and right sides of the above pixel:
    a prediction error calculating unit for obtaining a residual between the pixel value of the to-be-coded pixel and the predicted value;
    a variable length coding unit for coding the residual; and
    a context calculating unit for obtaining an absolute value of a difference between each of the neighboring pixel partners and the other with respect to said adjacent four pixels, performing a quantizing process for its sum total, and
  obtaining a coding context; and
  wherein said variable length coding unit changes a coding parameter responding to said coding context.

25. A decoding device, comprising:
  an initial resolution decoding unit for decoding an initial resolution image sub-sampled from an image at every interval of predetermined pixels from an input code; and
  a high resolution decoding unit for decoding images at sub-sampling intervals sequentially halved, wherein said high resolution decoding unit comprises:
  a first adjacent pixel extracting unit for extracting adjacent four pixels already decoded in previous resolution;
  a first pixel outputting unit for outputting a pixel value of a first pixel calculated by said pixel value calculating unit, said first pixel being positioned at a center of the adjacent four pixels extracted by said first adjacent pixel extracting unit;
  a second adjacent pixel extracting unit for, after said first pixel is decoded, extracting the adjacent four pixels already decoded that are positioned in an upper, lower, left, and right sides of a not-yet decoded second pixel being positioned in a left side of said first pixel;
  a second pixel outputting unit for outputting a pixel value of the second pixel calculated by said pixel value calculating unit, said second pixel being positioned at a center of the adjacent four pixels extracted by said second adjacent pixel extracting unit;
  a third adjacent pixel extracting unit for, after said first pixel is decoded, extracting the adjacent four pixels already decoded that are positioned in an upper, lower, left, and right sides of a not-yet decoded third pixel being positioned in an upper side of said first pixel; and
  a third pixel outputting unit for outputting a pixel value of the third pixel calculated by said pixel value calculating unit, said third pixel being positioned at a center of the adjacent four pixels extracted by said third adjacent pixel extracting unit.

26. A decoding device, comprising:
  an initial resolution decoding unit for decoding an initial resolution image sub-sampled from an image at every interval of predetermined pixels from an input code; and
  a high resolution decoding unit for decoding images at sub-sampling intervals sequentially halved:
  wherein said high resolution decoding unit comprises:
    a pixel value predicting unit for, out of the pixels that should be decoded in present resolution, predicting a value of a pixel being positioned at a center of adjacent four pixels already decoded in previous resolution from said adjacent four pixels with a linear interpolation, and predicting a value of a remaining pixel from adjacent four pixels having the above pixel at a center thereof with the linear interpolation after all of the above adjacent four pixels have been decoded in previous resolution and present resolution, said adjacent four pixels being positioned in an upper, lower, left and right sides of the above pixel;

a prediction error decoding unit for decoding a residual between the pixel value of the to-be-decoded pixel and the predicted value from the input code; and a pixel value calculating unit for calculating the pixel value, being a target, by adding said decoded residual to said predicted pixel value;

wherein said high resolution decoding unit comprises a context calculating unit for obtaining an absolute value of a difference between each of the neighboring pixel partners and the other with respect to said adjacent four pixels, performing a quantizing process for its sum total, and obtaining a coding context; and wherein said prediction error decoding unit changes a decoding parameter responding to said coding context.

* * * * *